United States Patent
Sato et al.

[11] Patent Number: 5,821,540
[45] Date of Patent: Oct. 13, 1998

[54] SEMICONDUCTOR RADIATION-DETECTING DEVICE

[75] Inventors: Keiji Sato; Yutaka Saitoh, both of Chiba; Teruji Cho, Ibaragi; Mafumi Kondoh, Ibaragi; Junko Kohagura, Ibaragi, all of Japan

[73] Assignee: Seiko Instruments, Inc., Chiba, Japan

[21] Appl. No.: 629,059

[22] Filed: Apr. 8, 1996

[30] Foreign Application Priority Data

| Apr. 12, 1995 | [JP] | Japan | 7-087177 |
| Dec. 1, 1995 | [JP] | Japan | 7-314539 |
| Feb. 8, 1996 | [JP] | Japan | 8-022859 |
| Mar. 5, 1996 | [JP] | Japan | 8-047576 |

[51] Int. Cl.$^6$ ............................................. G01T 1/24
[52] U.S. Cl. ................... 250/370.06; 250/370.1; 250/370.14
[58] Field of Search ..................... 250/370.06, 370.14, 250/370.1

[56] References Cited

U.S. PATENT DOCUMENTS

| 3,329,815 | 7/1967 | Kramer | 250/370.14 |
| 4,937,453 | 6/1990 | Nelson | 250/370.09 |
| 5,352,897 | 10/1994 | Horikawa et al. | 250/370.06 |

FOREIGN PATENT DOCUMENTS

| 1018402 | 1/1966 | United Kingdom | 250/370.06 |

*Primary Examiner*—Constantine Hannaher
*Attorney, Agent, or Firm*—Loeb & Loeb LLP

[57] ABSTRACT

A semiconductor radiation-detecting device enabling detection of radiation in different energy range. A large number of PIN diodes are laminated one over another with a spacer consisting of an insulator being interposed between each adjacent two of the laminate, whereby radiation is incident in a direction perpendicular to the wider surface of the PIN diode.

7 Claims, 17 Drawing Sheets

SEMICONDUCTOR RADIATION-DETECTING DEVICE

BACKGROUND OF THE INVENTION

1. Field of the Invention

The present invention relates to a silicon-based solid semiconductor radiation-detecting device and, more particularly, to a semiconductor radiation-detecting device with PIN junction used to detect a high energy of radiation such as X rays or y rays and to applications of this semiconductor device.

2. Description of the Related Art

Conventionally, as one technique in this field there is known a method wherein, as illustrated in FIG. 39 as a conceptual view, a scintillator crystal 5 and a PIN diode 1 are combined with each other and, by the scintillator crystal 5, radiation such as X rays is converted to light which is detected by the PIN diode 1.

As the PIN diode, there is known a planar type one which, as illustrated in FIG. 3 as a sectional view, has a $P^+$ type impurity region 11 on an $N^-$ type semiconductor substrate 10 thereof.

This is a semiconductor device which is a so-called "PIN diode" wherein, assuming now that a side wherein a $P^+$ type impurity region 11 exists as illustrated is called an obverse surface, the reverse surface thereof has an $N^+$ type impurity region 12 which is an N type impurity region having a concentration higher than that of the N type substrate.

This semiconductor device belongs to semiconductor devices wherein the impurity concentration of the $N^-$ type impurity region is to an extent of from $1 \times 10^{12}$ to $1 \times 10^{13}$ atoms/cm$^3$, such semiconductor devices being each termed "Pin" or "PIN" by using "i" of the English word "intrinsic" (intrinsic semiconductor).

Anode electrodes 14 are formed from the $P^+$ type impurity region 11.

On the obverse surface there is an $N^+$ type impurity region 13 becoming a channel stopper and therefore cathode electrodes 15 may be also formed from the same surface as that from which the $P^+$ type impurity concentration region 11 is formed.

When a reverse bias voltage has been applied to its PN junction, the PIN diode has a junction capacitance smaller than that of each of other PN junction diodes and therefore is suitable for high speed response and therefore widely used.

In order to perform the energy distribution measurement or spectroscopic measurement of the radiation by the use of the above-mentioned method, it is necessary to perform the pulse height analysis by utilizing the fact that in the pulse mode electric charge is proportionate to energy. Also, it is necessary to extend the depletion layer until the same is saturated as much as possible, namely, to make the junction capacitance small by applying a high reverse voltage.

Regarding the output, a technique of inserting, for example, a loading resistor and inputting a voltage generating in the loading resistor to a preamplifier as the output signal is used.

In the current mode wherein current is directly measured, no data concerning the energy is obtained.

Although the above refers to a case of using an $N^-$ type semiconductor substrate, the same applies to a case of using a $P^-$ semiconductor substrate and having an $N^+$ type impurity region. Although in the present invention all explanation made hereafter will be given using an $N^-$ type semiconductor substrate by way of example, it of course applies also to a PIN structure which uses a $P^-$ type semiconductor substrate and $N^+$ type impurity region.

Since conventional radiation detection is made using the method referred to as above, because of using, for example an X-ray CT apparatus in the current mode wherein the reverse voltage is 0V it was difficult to obtain a tomography image by use of radiations in different energy range.

Also, even when measurement is performed in the pulse mode by applying a high reverse voltage, in a case where photons are large in number, the pile-up phenomena that pulse-to-pulse superposition is made occur with the result that even when pulse height analysis is performed, accurate spectroscopic measurement was impossible.

SUMMARY OF THE INVENTION

The present invention has been made in order to solve the above-mentioned problems and an object of the present invention is to provide a semiconductor radiation-detecting device which enables detection of radiations in different energy range.

To attain the above object, according to a first aspect of the present invention, there is provided a semiconductor radiation-detecting device wherein PIN diodes are laminated one over another and radiation is incident on the resulting laminate in a direction perpendicular to the semiconductor substrate (laminated surface), whereby signals obtained are detected independently in semiconductor-substrate units.

According to a second aspect of the present invention, there is provided a semiconductor radiation-detecting device wherein the substrate of the PIN diodes is made to have a specific resistance of 1 kΩ·cm or more According to a third aspect of the present invention, there is provided a semiconductor radiation-detecting device wherein the thickness of a portion of the semiconductor substrate corresponding to the $P^+$ type impurity region is made thinner than the other portions thereof.

According to a fourth aspect of the present invention, there is provided a semiconductor radiation-detecting device wherein an $N^-$ type semiconductor layer is formed, as the semiconductor substrate, on a support substrate having an insulative layer thereon and a $P^+$ type impurity region is formed in the $N^-$ type semiconductor layer, a portion of the support substrate corresponding to this junction layer being removed.

According to a fifth aspect of the present invention, there is provided a semiconductor radiation-detecting device wherein a large number of $P^+$ type impurity regions are formed in the $N^-$ type semiconductor layer by division thereof and an absorption layer or layers are formed on an incidence surface with the thicknesses thereof being different in $P^+$ type impurity region units.

According to a sixth aspect of the present invention, there is provided a semiconductor radiation-detecting device wherein the absorption layer is formed using a $SiO_2$, silicon nitride, Al, or Si.

According to a seventh aspect of the present invention, there is provided a semiconductor radiation-detecting device wherein a plurality of sets of $P^+$ type impurity regions, each set being composed of a plurality of $P^+$ type impurity regions whose absorption layers have different amounts of absorption of radiation, are disposed.

According to an eighth aspect of the present invention, there is provided a semiconductor radiation-detecting device wherein a plurality of PIN diodes are arranged whereby radiation is incident so as to pass through two or more of the PIN diodes in a direction perpendicular to the thicknesswise direction of the semiconductor substrate to thereby detect radiation in different energy range.

According to a ninth aspect of the present invention, there is provided a semiconductor radiation-detecting device wherein laminates wherein PIN diodes are laminated are piled up one over the other with the surfaces of the substrates being made perpendicular to each other, whereby radiation is incident directly thereon in a direction perpendicular to a surface of bond between the laminates.

According to a tenth aspect of the present invention, there is provided a semiconductor radiation-detecting device wherein there are two or more PIN diodes and, in one group thereof, radiation is incident directly thereon in a direction perpendicular to the thickness wise direction of the substrate while, on the other hand, in another group thereof, radiation is incident thereon in a direction parallel with the thickness-wise direction of the substrate.

According to an eleventh aspect of the present invention, there is provided a semiconductor radiation-detecting device wherein PIN diodes are laminated and radiation is incident thereon from a direction perpendicular to the laminated surface and a direction parallel therewith, whereby the detection surfaces are changed in number from two surfaces to five surfaces.

According to a twelfth aspect of the present invention, thee is provided a semiconductor radiation-detecting device wherein measurement of radiation is performed in a current mode.

According to a thirteenth aspect of the present invention, there is provided a semiconductor radiation-detecting device wherein measurement of radiation is performed with the reverse voltage being made bias-free.

Other objects, features and advantages of the present invention will become apparent from the following description taken in conjunction with the accompanying drawings in which.

DETAILED DESCRIPTION OF THE PREFERRED EMBODIMENTS

Embodiments of the present invention will now be described in detail with reference to the drawings.

Figure 1:
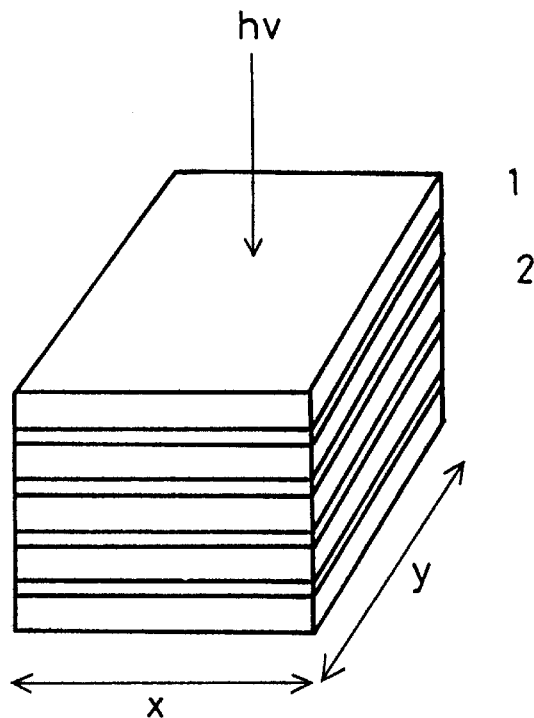
FIG. 1 is a perspective view illustrating a semiconductor device according to a first embodiment of the present invention.
Figure 3:
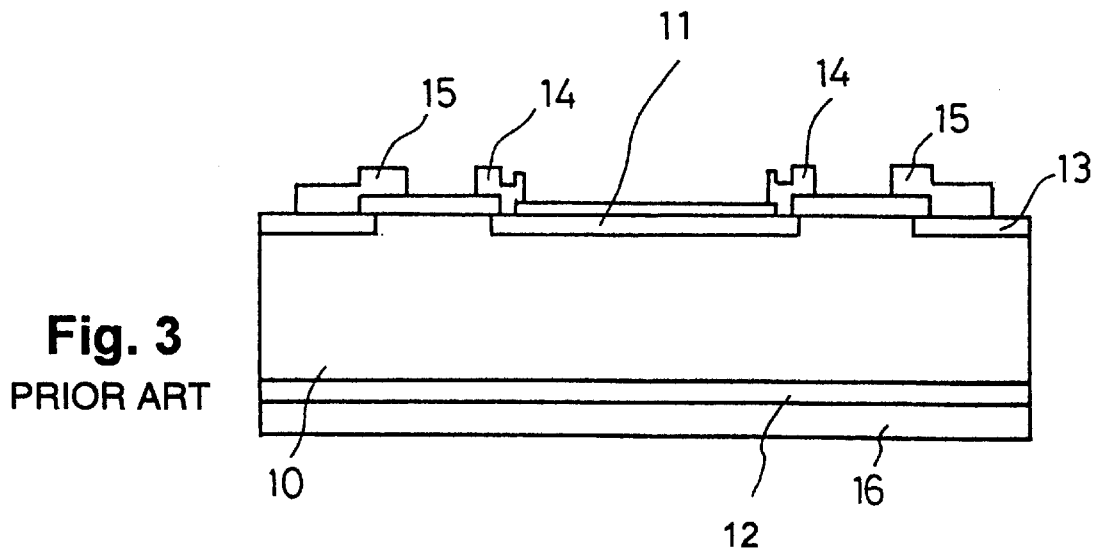
FIG. 3 is a sectional view illustrating a PIN diode.

FIG. 1 is a perspective view illustrating a semiconductor device according to a first embodiment of the present invention, wherein a large number of PIN diodes 1 illustrated in FIG. 3 are laminated with a spacer 2 consisting of an insulative material being interposed between each adjacent two thereof.

Radiation is incident on a wider surface of the PIN diode 1, i.e., ordinary light receiving surface thereof in which a P$^+$ type impurity region is formed, in a direction perpendicular with respect thereto.

As a result of this, a lower PIN diode detects a high energy of radiation having transmitted through an upper layer or layers. Namely, the lower the layer, the relatively higher becomes the intensity of a high energy band of radiation.

Figure 2:
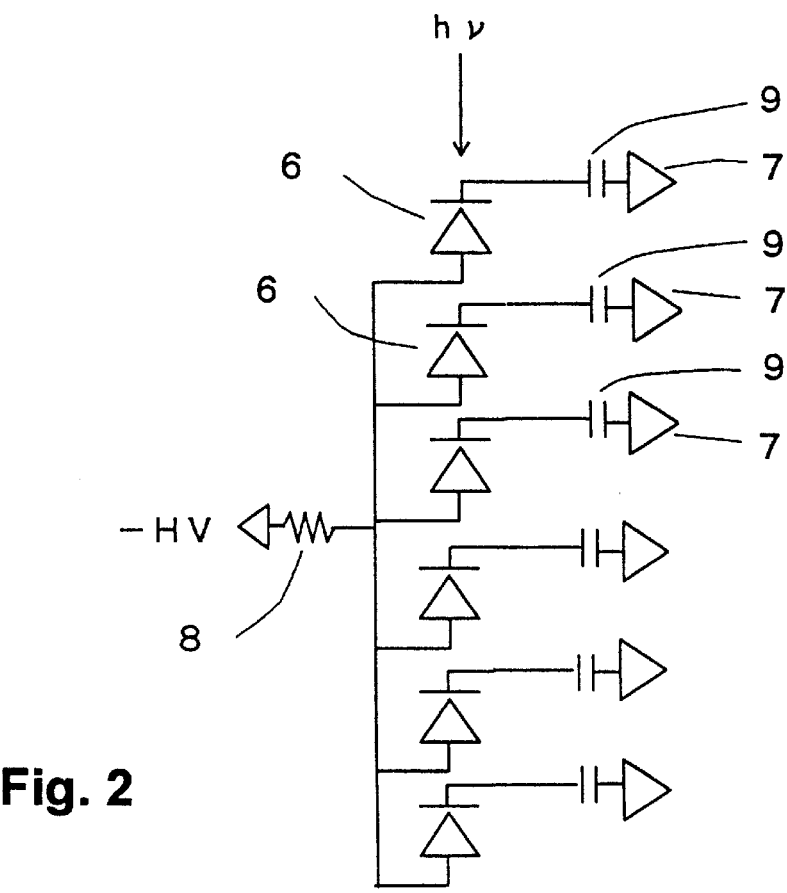
FIG. 2 is a circuit diagram illustrating the semiconductor device according to the first embodiment of the present invention.

FIG. 2 is a circuit diagram illustrating the semiconductor device according to the first embodiment of the present invention, wherein radiation is incident on PIN diodes 6 and the resulting signals thereof are independently input through capacitors 9 to preamplifiers 7 in PIN diode units. A symbol HV represents a reverse voltage which is commonly applied through a resistor 8 to the cathode electrode side thereof.

Note that the circuit which can be actually used are not particularly limited to that illustrated in FIG. 2 and may be of various types.

Figure 4:
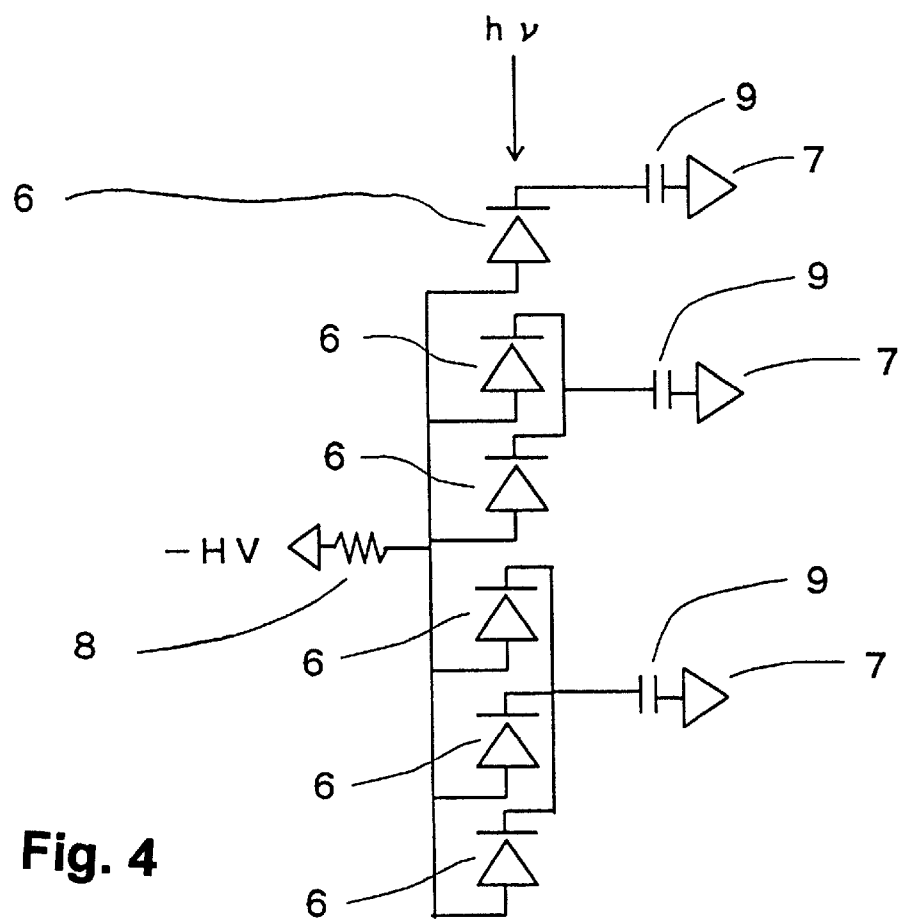
FIG. 4 is a circuit diagram illustrating a semiconductor device according to a second embodiment of the present invention.

FIG. 4 is a circuit diagram illustrating a semiconductor device according to a second embodiment of the present invention. In this case, two layers thereof which are second and third layers and three layers thereof which are fourth, fifth and sixth layers are respectively connected in parallel to each other and to one another.

In this case as well, the method for applying a reverse voltage and the method for outputting to a succeeding circuit are not limited to those illustrated in FIG. 4.

Since the detection efficiency of radiation depends on the depth of the depletion layer, it is better to spread the depletion layer as much as possible in order to detect radiation with a great transmission force.

At this time, it is better for the reverse voltage not to become very high.

To this end, it is better for the specific resistance of the substrate to be high.

The lower limit of the thickness of a practical substrate is around 200 $\mu$m and it is impossible to handle a substrate having a thickness which is below the same.

Regarding the substrate having a thickness of 200 $\mu$m which is the lower limit of the practical thickness, in order to saturate the depletion layer thereof by applying a voltage of 100 V or more the specific resistance thereof needs to be 1 k$\Omega$·cm or more.

The thickness of a silicon semiconductor substrate usually used is around 600 $\mu$m. Increasing the thickness of the semiconductor substrate and the depth of the depletion layer thereof to values which are greater than the same is not preferable because the amount of dark current is extremely increased.

In such a case, inconveniences of, for example, requiring the use of a specific resistance as high as 10 k$\Omega$·cm or more or requiring the use of a voltage as high as 100 V or more occur.

The specific resistance of Si which can at present be practically obtained is around 20 k$\Omega$·cm and, on a mass-production basis, is around 8 k$\Omega$·cm.

Also, the voltage which can be easily obtained is 100 or 200 V. For example, in the case of a substrate having a specific resistance of 20 k$\Omega$·cmK, a depletion layer of 1 mm is obtained by applying a voltage of 200 V and a depletion layer of 750 $\mu$m is obtained by applying a voltage of 100 V.

In the case of a substance having a specific resistance of 8 k$\Omega$·cm, 700 $\mu$m is obtained with 200 V and 500 $\mu$m is obtained with 100 V.

When the largeness of the dark current, the practically obtainable specific resistance of the substrate, the applied voltage handled and the breakdown are taken into consideration, it is preferable to set the thickness of the substrate to be 1 mm or less.

Also, in a usual process of mass production, it is preferable to set it to be around 600 $\mu$m.

Regarding the substrate having a high specific resistance, the specific resistance thereof is liable to decrease according to the manufacturing process. Particularly, the larger the thickness of the substrate is, the more prominent becomes this tendency and also the more difficult becomes the formation of less defective PN junctions.

Accordingly, the use of a silicon semiconductor substrate high in specific resistance and large in thickness is not preferable.

On the other hand, making radiation incident directly on the PIN diode provides a high detection efficiency and high resolving power compared to the case of using a scintillator.

However, when the depletion layer is 1 mm or less, the detection efficiency of radiation having an energy of 10 keV or more decreases. Particularly, the detection efficiency of radiation having an energy of 50 keV or more is remarkably low.

In the present invention, even when the thickness of the substrate is 1 mm or less, it is possible to sufficiently detect a high energy of radiation.

As an example thereof, as in the second embodiment of the present invention, it is better to synthesize signals from two or three layers of the laminated PIN diodes.

Figure 5:
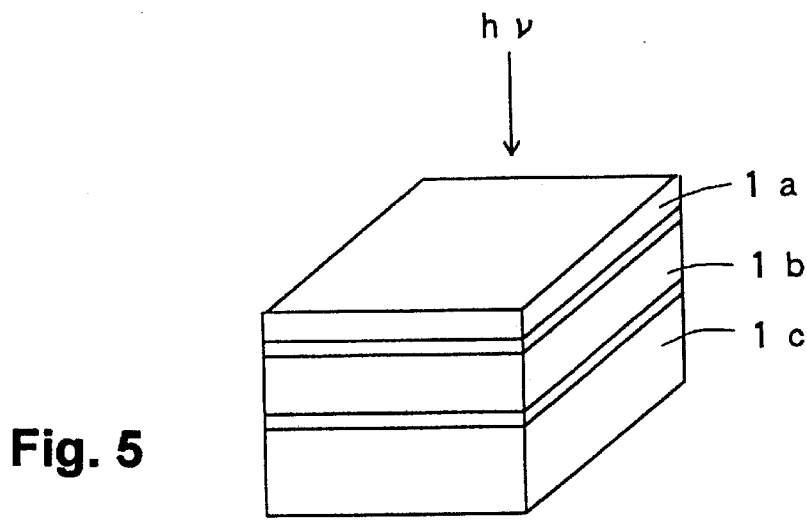
FIG. 5 illustrates a semiconductor device according to a third embodiment of the present invention.

FIG. 5 is a perspective view illustrating a semiconductor device according to a third embodiment of the present invention, wherein the thickness of the semiconductor substrate is varied. Assuming that radiation is incident on the semiconductor device from above, when calling the PIN diodes the "first layer", "second layer",—from above, the semiconductor device is as an example formed such that a PIN diode 1a as the first layer is 200 μm, a PIN diode 1b as the second layer is 400 μm and a PIN diode 1c as the third layer is 600 μm in terms of the thickness dimensions. By the semiconductor device being formed as such, it is possible to increase the high-energy radiation detection efficiency in the lower layer.

Figure 36:
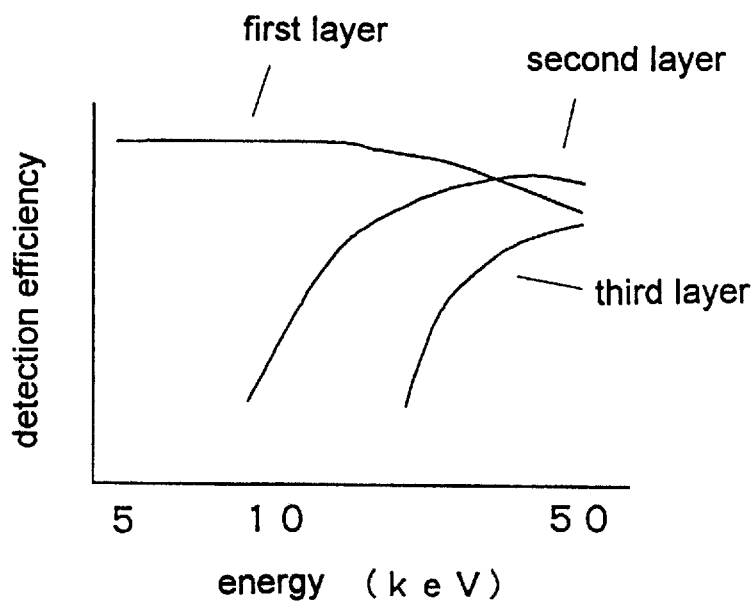
FIG. 36 is a characteristic curve diagram illustrating the detection efficiency of radiation energy in the case of the third embodiment of the present invention.

FIG. 36 is a characteristic curve diagram illustrating the detection efficiency of the radiation energy according to the third embodiment of the present invention, wherein it is seen that as the layer becomes lower in such a manner as the second layer and third layer as counted downward from the first layer, the detection efficiency in a high energy region becomes higher.

Figure 40:
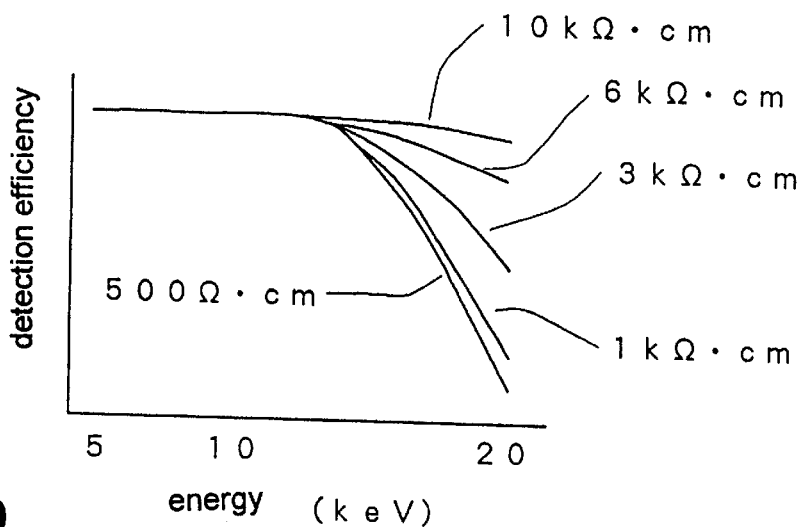
FIG. 40 is a characteristic curve diagram illustrating the detection efficiency of radiation energy when the specific resistance of the substrate is varied.

FIG. 40 is a characteristic curve diagram illustrating the detection efficiency of the radiation energy when the specific resistance of the substrate is varied. In this case, the thickness of the substrate is 500 μm and the depth of the depletion layer is 200 μm whereupon the applied reverse voltage differs according to the specific resistances of the substrate.

It is seen that even when the depletion layer has the same depth, the higher the specific resistance of the substrate, the higher becomes the detection efficiency of radiation with high energy.

However, in the case of 1 kΩ·cm or less, the resulting effect is small. Therefore, in the present invention, when using a silicon semiconductor substrate having a specific resistance of particularly 1 kΩ·cm or more, the detection efficiency in a region of high energy becomes high.

Figure 6:
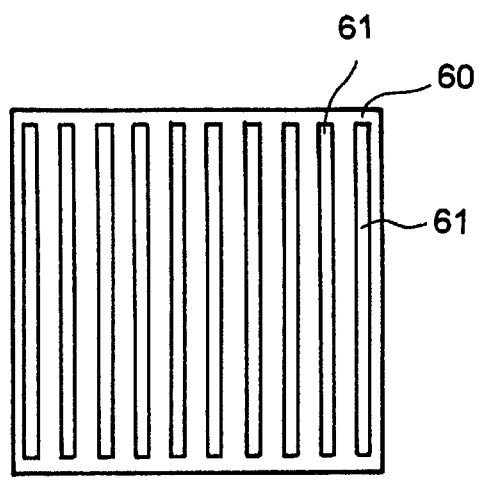
FIG. 6 is a plan view illustrating a structure of $P^+$ type impurity regions of a one PIN diode element constituting a semiconductor device according to a fourth embodiment of the present invention.

FIG. 6 is a plan view illustrating a structure of $P^+$ type impurity region of a single PIN diode element of a semiconductor device according to a fourth embodiment of the present invention. The $P^+$ type impurity region 61 formed in an $N^-$ type semiconductor substrate 60 is divided in the form of strips. By laminating this single PIN diode element as illustrated in FIG. 1, it is possible to obtain one-dimensional (linear) data.

Note the following. The basic structure of the single PIN diode is in any case as illustrated in FIG. 3. Even if the structure as described later may partly differ therefrom, for example, in that the $N^-$ type impurity region 13 and the cathode electrode 15 which is an electrode thereof are omitted, the same applies to the following description. Also, in the following description, for brevity of explanation, there are cases where the structure of components other than the $P^+$ type impurity region is omitted.

Figure 7:
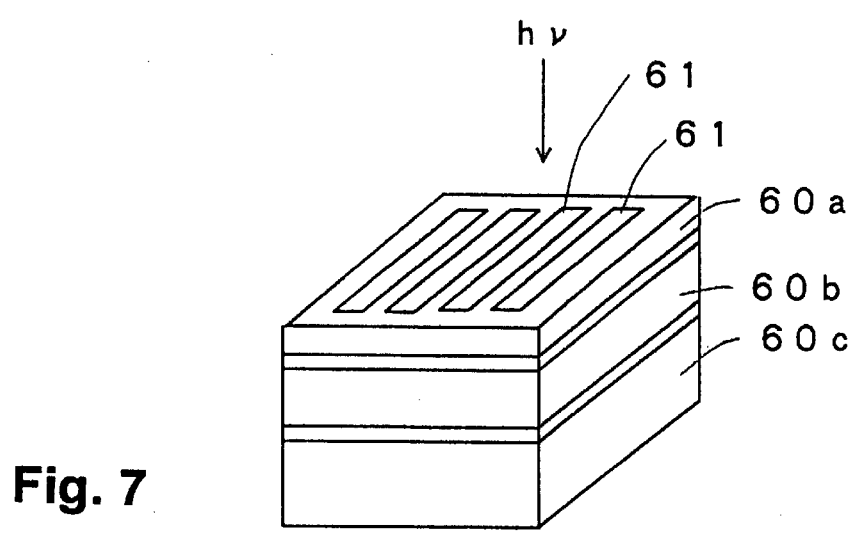
FIG. 7 is a perspective view illustrating a semiconductor device according to a fifth embodiment of the present invention.

FIG. 7 is a perspective view illustrating a semiconductor device according to a fifth embodiment of the present invention, wherein PIN diode elements consisting respectively of an $N^-$ type semiconductor substrate 60a, $N^-$ type semiconductor substrate 60b and $N^-$ type semiconductor substrate 60c, each of which has a different thickness and a multi-strip structure of $P^+$ type impurity region 61 as illustrated in FIG. 6, are laminated so that the thickness of the substrate becomes larger from the top toward the bottom as in the case of FIG. 5. In this case, although the semiconductor device is composed of three layers by way of example, this number is of course not particularly meaningful but may be more than three or less than three. This is also the case with the way of arranging the semiconductor substrates or the way of dividing the $P^-$ type impurity region.

Figure 8:
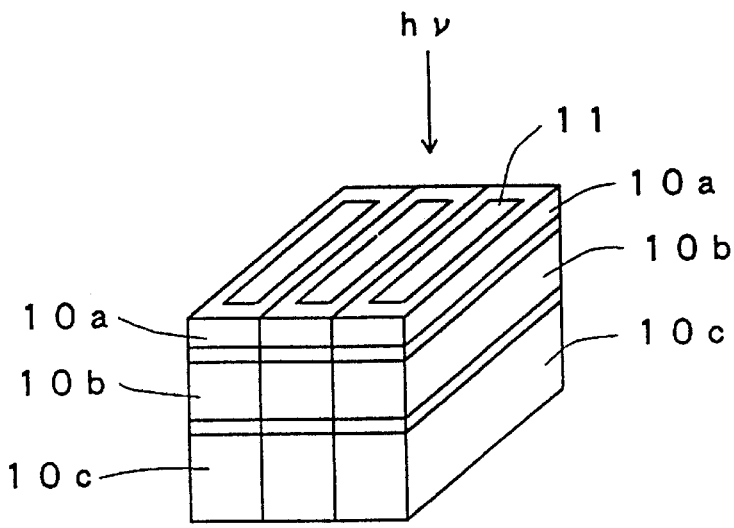
FIG. 8 is a perspective view illustrating a semiconductor device according to a sixth embodiment of the present invention.

FIG. 8 is a perspective view illustrating a semiconductor device according to a sixth embodiment of the present invention. In this case, the same structure as that illustrated in FIG. 7 is prepared with the use of the PIN diode elements each having a single $P^+$ type impurity region 11, wherein PIN diode elements consisting respectively of an $N^-$ type semiconductor substrate 10a, $N^-$ type semiconductor substrate 10b and $N^-$ type semiconductor substrate 10c, each of which has a different thickness, are laminated so that the thickness of the substrate becomes larger from the top toward the bottom and this laminate is arranged laterally. In a case where a large number of $P^+$ type impurity regions are formed in the same substrate, it sometimes happens that cross-talk becomes problematic according to the way of use. In this sixth embodiment of the present invention as illustrated in FIG. 8, it is possible to avoid occurrence of cross-talk.

Figure 9:
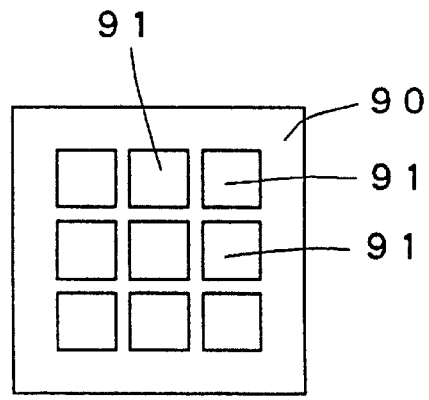
FIG. 9 is a plan view illustrating a structure of $P^+$ type impurity regions of a one PIN diode element constituting a semiconductor device according to a seventh embodiment of the present invention.

FIG. 9 is a plan view illustrating a structure of $P^+$ type impurity region of a single PIN diode element in a semiconductor device according to a seventh embodiment of the present invention, wherein a $P^+$ type impurity region 91 formed in an $N^-$ type semiconductor substrate 90 is divided in large number into square shapes. By laminating this single PIN diode element as in FIG. 1, it is possible to obtain two-dimensional data.

Note that when in this case the thickness of the substrate in each layer is varied as in FIG. 5, it is possible to increase the detection efficiency of the high energy radiation in a lower layer.

Figure 10:
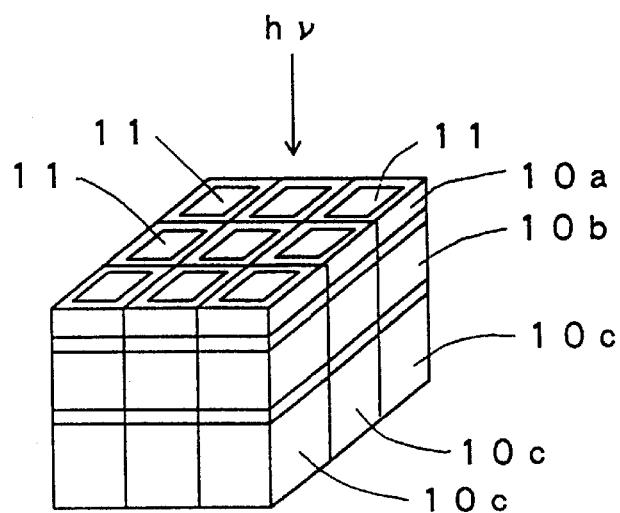
FIG. 10 is a perspective view illustrating a semiconductor device according to an eighth embodiment of the present invention.

FIG. 10 is a perspective view illustrating a semiconductor device according to an eighth embodiment of the present invention, wherein the semiconductor devices having basically the same function as in FIG. 9 and constituted by PIN diode elements consisting respectively of an $N^-$ type semiconductor substrate 10a, $N^-$ type semiconductor substrate 10b and $N^-$ type semiconductor substrate 10c, each of which has a different thickness, are laminated so that the thickness of the substrate becomes larger from the top toward the bottom and this laminate is arranged two-dimensionally. In this case as well, no cross-talk occurs.

According to the above-mentioned structure, a low energy of radiation which is around 10 keV or less is for the most part absorbed and detected by the first layer or the layers in the vicinity thereof, namely, the lower the layer, the larger becomes the amount of data on high-energy radiation, with the result that data on an energy band which differs according to each layer is obtained.

Also, at this time, by causing the spacer to have the function of absorbing a low energy of radiation, more excellent results are obtained.

Meanwhile, the thickness of the semiconductor substrate which can be handled in actual working operations is for example 200 μm at most and it is virtually impossible to handle the semiconductor substrate thinner than the same.

The thickness of the semiconductor substrate as one detection layer serves as the thickness of an absorption layer for the semiconductor substrate located beneath it. Therefore, when it is desired to make small the absorption of radiation by one detection layer, it is necessary to consider other methods.

Figure 11:
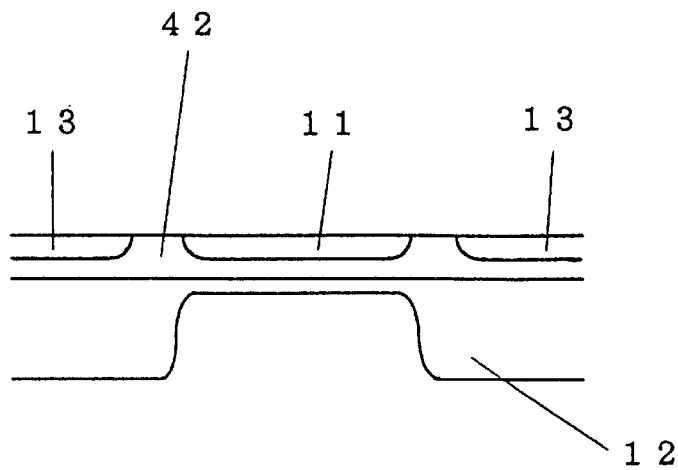
FIG. 11 is a sectional view illustrating a one PIN diode element constituting each of semiconductor devices according to ninth and tenth embodiments of the present invention.

FIG. 11 is a sectional view illustrating a single PIN diode element used in a semiconductor device according to a ninth embodiment of the present invention, wherein an $N^-$ type impurity layer 42 is located on a thick $N^+$ type impurity region 12 and a $P^-$ impurity region 11 and $N^+$ type impurity regions 13 are formed therein and the portion of the $N^+$ type impurity region 12 above which the $P^+$ type impurity region 11 is formed is cut out and made thinner than the other portions thereof.

Actually, this structure is obtained by, for example, causing epitaxial growth of the $N^-$ type impurity layer on the $N^+$ type semiconductor substrate.

As mentioned above, the thickness of 200 $\mu$m or less and of down to 3 $\mu$m which is a lower limit for enabling formation of a PN junction is obtained.

By laminating the PIN diode elements of FIG. 11 in the same manner as in FIG. 1, the semiconductor device according to the ninth embodiment of the present invention is obtained, to provide a semiconductor device of which a single layer is very thin.

By laminating the PIN diode elements of FIG. 11 with the thickness of the substrate or $N^-$ type impurity layer being varied as in the case of the structure illustrated in FIG. 5, a semiconductor device according to a tenth embodiment of the present invention is obtained.

Figure 12:
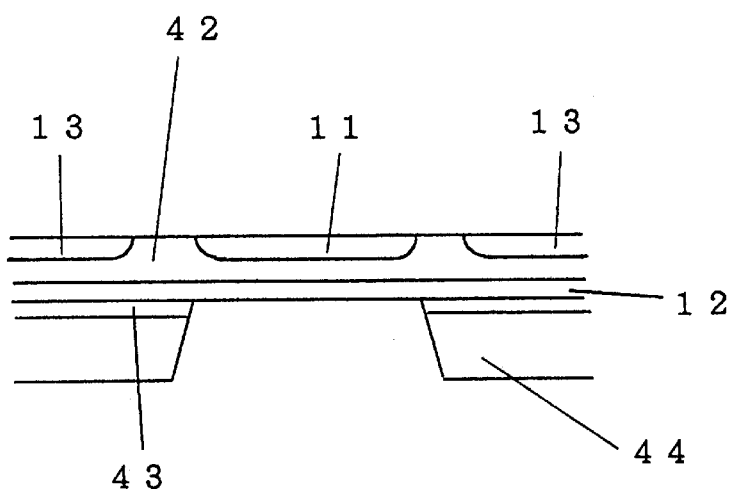
FIG. 12 is a sectional view illustrating a one PIN diode element constituting each of semiconductor devices according to eleventh and twelfth embodiments of the present invention.

FIG. 12 is a typical sectional view illustrating a single PIN diode element used in a semiconductor device according to an eleventh embodiment of the present invention, wherein an $N^-$ type impurity layer 42 having the $P^+$ type impurity region 11 and $N^+$ type impurity regions 13 formed in one surface thereof and having the $N^+$ type impurity region 12 formed in the other surface thereof is disposed on a support substrate 44 consisting of silicon and having formed on the surface thereof an insulative layer 43 which is a thermally oxidized $SiO_2$ film, the portion of the support substrate which corresponds to the PN junction being removed, whereby the semiconductor device is of a structure wherein a very thin PIN diode is disposed on the support substrate.

This structure is obtained as follows.

Onto the surface of the support substrate 44 consisting of a semiconductor substrate produced from silicon with (100) orientation by use of a CZ method and having a thickness of around 400 $\mu$m there are bonded through the intermediary of the insulative layer 43 consisting of a thermally oxidized film an $N^-$ type semiconductor substrate produced by use of an FZ method, having a specific resistance of, for example, 50 $\Omega$·cm or more and a thickness of around 300 $\mu$m, and having the $N^+$ type impurity region 12 previously formed thereon, whereby the resulting structure on the $N^-$ type semiconductor substrate side is polished and made to be an $N^-$ type impurity layer 42.

This is an SOI substrate of a so called "bonded structure".

The support substrate 44 serves to reinforce and support the $N^-$ type impurity layer 42 during the manufacturing process step. A silicon substrate having an equal coefficient of thermal expansion is preferable. When taking into consideration the heat treatment process step at high temperature performed in the high-temperature semiconductor manufacturing process steps, a substrate produced from silicon having a high strength against heat treatment by use of the CZ method is most preferable.

When adopting the structure according to this embodiment, the specific resistance of the $N^-$ type impurity layer can be also made to be several k$\Omega$·cm or more, which value can not be obtained from an epitaxial layer.

When making the support substrate to be a substrate consisting of silicon with (100) plane orientation, the removed portion thereof can be made up into a structure wherein stress concentration is eased by an anisotropic etching method using KOH or the like. Thus, the resulting structure can be made high in mechanical strength.

By laminating the PIN diode elements of FIG. 12 in the same manner as in FIG. 1, the semiconductor device according to the eleventh embodiment of the present invention is obtained and becomes a semiconductor device of which a single layer is very small in thickness.

By laminating the PIN diode elements of FIG. 12 with the thickness of the substrate or $N^-$ type impurity layer being varied as in the case of the structure illustrated in FIG. 5, a semiconductor device according to a twelfth embodiment of the present invention is obtained.

The semiconductor devices according to the ninth to the twelfth embodiment of the present invention are effective for detecting X rays in different energy range in particularly a low energy region of 10 keV or less.

Figure 13:
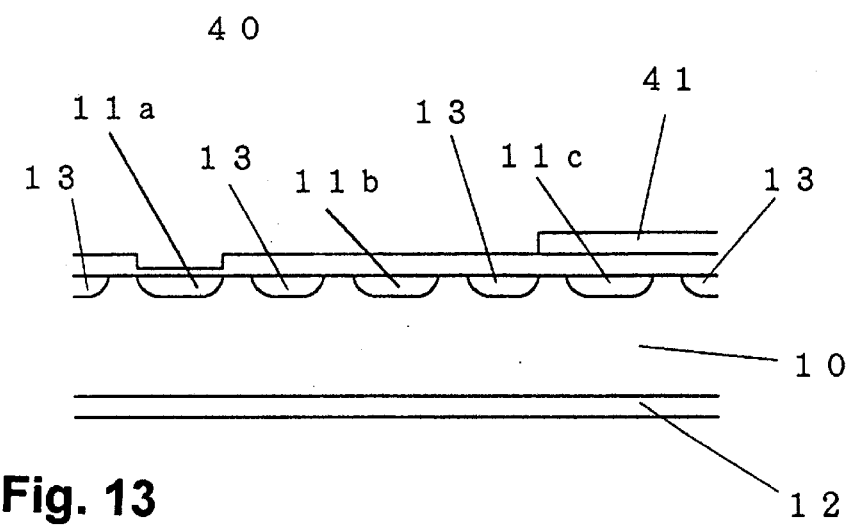
FIG. 13 is a sectional view illustrating a semiconductor device according to a thirteenth embodiment of the present invention.

FIG. 13 is a sectional view illustrating a semiconductor device according to a thirteenth embodiment of the present invention, wherein in one surface of an $N^-$ type semiconductor substrate 10 there are formed a large number of $P^+$ type impurity regions 11g, 11h and 11i with these regions being isolated from each other by $N^+$ type impurity regions 13 and on the opposite side surface thereof there is formed an $N^+$ type impurity region 12.

A $SiO_2$ film 40 and a $Si_3N_4$ film 41 are formed on these $P^+$ type impurity regions. The $SiO_2$ film 40 on the $P^+$ type impurity region 11g is made thin. In contrast, the $SiO_2$ film 40 on the $P^+$ type impurity region 11h is made thicker than the $SiO_2$ film 40 on the $P^+$ type impurity region 11g. Further, on the $P^+$ type impurity region 11i there is formed the thick $SiO_2$ film 40 on which there is further formed the $Si_3N_4$ 41. For this reason, respective energy range of radiation incident on the PN junctions formed by the $P^+$ type impurity regions 11g, 11h and 11i differ in terms of the intensity ratio thereamong.

The $SiO_2$ film 40 and $Si_3N_4$ film 41 become absorption layers with respect to radiation such as X rays, y rays or charged particle rays and the transmittance of respective energy range of radiation differs according to the thickness thereof.

Note that also by utilizing materials of different atomic numbers instead of the thickness, it is possible to vary the transmittance of respective energy range of radiation.

In the silicon semiconductor process, particularly Al film and polysilicon film are easy to utilize as materials constituting absorption layers.

For making the amount of absorption large, the use of Al and polysilicon is better and for making the amount of absorption small the use of $SiO_2$ and $Si_3N_4$ is better.

Making, for example, silicon thick in order to make the amount of absorption large is liable to cause a decrease in the film quality and therefore there are cases where concurrent use of Al and polysilicon is preferable.

Also, forming polysilicon and Al directly on a single crystal silicon constituting a substrate sometimes affects the performance of the element. In this case, it is necessary to first form a $SiO_2$ film and then form an Al and a polysilicon film thereon. As mentioned above, as the absorption layer or layers, it is necessary to make single or concurrent use of a $SiO_2$ film, $Si_3N_4$ film, Al film and polysilicon film.

Figure 14:
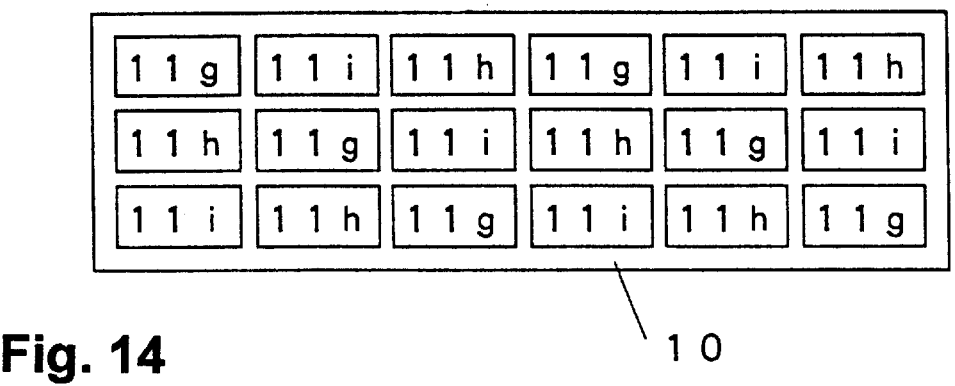
FIG. 14 is a conceptual plan view illustrating a structure of $P^+$ type impurity regions of a one PIN diode element constituting a semiconductor device according to a fourteenth embodiment of the present invention.
Figure 41:
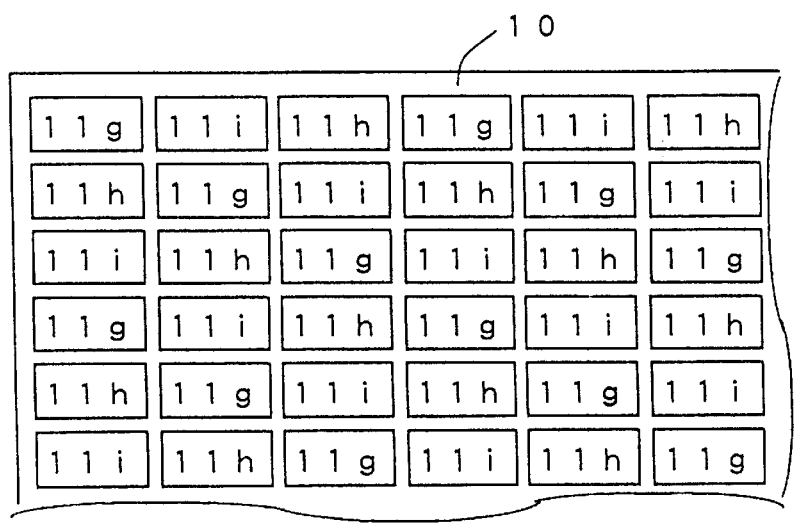
FIG. 41 is a typical plan view illustrating the plan disposition of the P$^+$ type impurity region of the semiconductor device according to the thirty fifth embodiment of the present invention.

FIGS. 14 and 41 are typical plan views illustrating the plan dispositions of $P^+$ type impurity regions in semiconductor devices according to fourteenth and thirty fifth embodiments of the present invention. The $P^+$ type impurity regions 11g, 11h and 11i each have basically the same structure as that illustrated in FIG. 13, and both semiconductor devices are applications wherein the semiconductor device as illustrated in FIG. 13 according to the thirteenth embodiment of the present invention is converted to one-dimensional or two-dimensional versions.

As illustrated in FIG. 14, the three $P^+$ type impurity regions 11g, 11h and 11i formed in the $N^-$ type semiconductor substrate 10, which regions 11g, 11h and 11i constitute the basic factors, are disposed regularly.

Although this disposition is an example, this way of disposing is already a customary way when a display device is converted to a color version by use of three primary colors. By regular dispositions of fine $P^+$ type impurity regions having a plurality of different detectable energy range, the one-dimensional version becomes possible with the regular disposition as illustrated in FIG. 14 and the two-dimensional version becomes possible with the regular disposition as illustrated in FIG. 41.

In this case, the $P^+$ type impurity region constituting the basic factor is not limited to three in kind.

Figure 15:
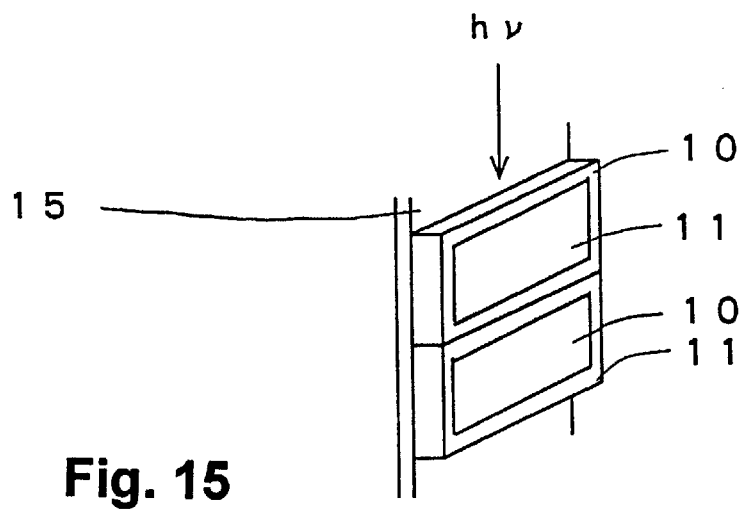
FIG. 15 is a perspective view illustrating a semiconductor device according to a fifteenth embodiment of the present invention.

FIG. 15 is a perspective view illustrating a semiconductor device according to a fifth embodiment of the present invention, wherein the single PIN diode element illustrated in FIG. 3 as a typical sectional view is arranged successively two in number on a mounting substrate 15 and radiation is made to be incident thereon in parallel with a surface of the $N^-$ type semiconductor substrate 10 where the $P^+$ type impurity region 11 is formed, namely, with an end surface of the $N^-$ type semiconductor substrate 10 of an ordinary PIN diode being made to be an incidence surface, whereby radiation having transmitted through a first PIN diode is made to be incident on the next PIN diode in parallel with the surface thereof where the $P^+$ type impurity region 11 is formed.

Figure 16:
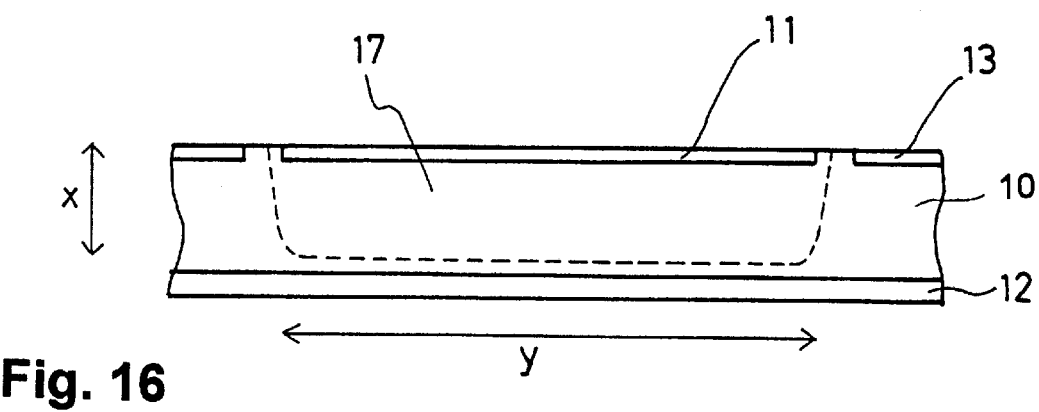
FIG. 16 is a sectional view illustrating a state of a depletion layer.

As mentioned above, when radiation is incident in parallel with the surface having the $P^+$ type impurity region formed therein, namely in a direction perpendicular to the thicknesswise direction of the substrate, as in a state of a depletion layer 17 illustrated in FIG. 16 as a typical sectional view, the effective thickness of the depletion layer becomes y, namely, a width of the $P^+$ type impurity region 11 as viewed in the incidence direction of the radiation, with the result that even if the specific resistance of the substrate and the reverse voltage are not made to be very high, it becomes very easy to make the effective thickness of the depletion layer to be several mm or several cm.

In this figure, in one surface of the $N^-$ type semiconductor substrate 10 there are formed a $P^+$ type impurity region 11 and $N^+$ type impurity region 13 becoming a channel stopper and on the other surface thereof there is formed an $N^+$ type impurity region 12.

As the radiation energy becomes higher, it is necessary to make the depletion layer larger in thickness and therefore the semiconductor device as illustrated in FIG. 16 becomes effective particularly for detecting a high radiation energy of 10 keV or more.

When an ordinary silicon semiconductor substrate is used, making radiation incident thereon in parallel with the thicknesswise direction thereof results in that the detection efficiency of the high energy of 10 keV or more rapidly decreases. This is because, as mentioned above, the thickness of the silicon semiconductor substrate used usually is around 600 $\mu$m and is limited to 1 mm at most.

It is not preferable to further increase the thickness of the semiconductor device and thereby further increase the depth of the depletion layer. Because the amount of dark current becomes increased very much. In addition, inconveniences of, for example, requiring the use of a specific resistance as high as 10 k$\Omega$·cm or more or the use of a voltage as high as 100 V or more occur. Accordingly, the method of the present invention enabling the use of a usually obtainable silicon semiconductor is excellent.

In this case, since the region extending from the end surface to the depletion layer becomes an absorption layer, when making radiation incident in a direction perpendicular to the thicknesswise direction of the substrate, the detection performance of the radiation whose energy is 10 keV or less becomes inferior.

Extending the depletion layer up to the end surface causes a rapid increase in the dark current and therefore it is by all means necessary to stop the formation of the depletion layer by means of, for example, forming the $N^-$ type impurity region 13 as illustrated in FIG. 16. Conversely, however, by varying the thickness of the portion near this end surface where no depletion layer is formed, it becomes possible to vary the detectable energy range of the radiation which transmits through this portion and reaches the depletion layer.

Accordingly, the semiconductor device according to the fifteenth embodiment of the present invention as illustrated in FIG. 15 becomes effective for detecting data on different energy range of the high-energy radiation and is very effective particularly when a limitation is imposed on the area of incidence surface of the radiation because of the necessity arising from, for example, position resolving power.

Figure 17:
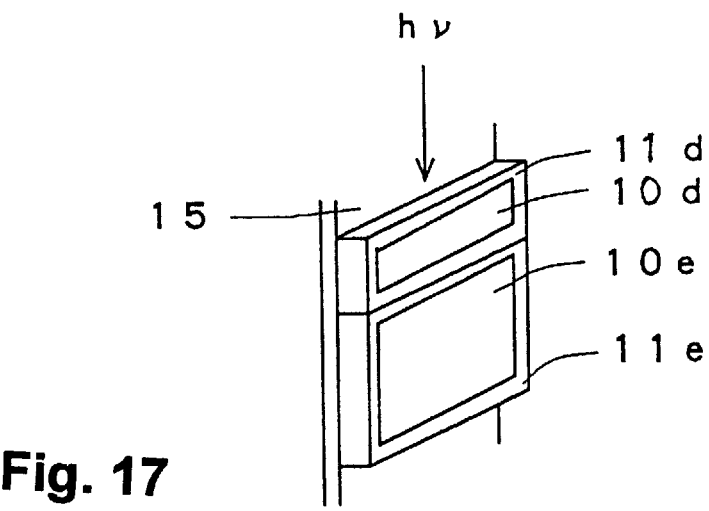
FIG. 17 is a perspective view illustrating a semiconductor device according to a sixteenth embodiment of the present invention.

FIG. 17 is a perspective view illustrating a semiconductor device according to a sixteenth embodiment of the present invention, wherein on a mounting substrate 15 there are arranged two PIN diodes, i.e., an $N^-$ type semiconductor substrate 11d and $N^-$ type semiconductor substrate 11e different in width from each other which have a $P^+$ type impurity region 10d and $P^+$ type impurity region 10e, and wherein the length of the $P^+$ type impurity region 10e of the PIN diode on which radiation is incident later as viewed in a direction parallel with the advancing direction of the radiation is greater than the length of the $P^+$ type impurity region 10d on which the radiation is incident initially as viewed in a direction parallel with the advancing direction thereof. As a result of this, it is possible to increase the detection efficiency of radiation in the high-energy region which is obtained by the PIN diode on which the radiation is incident later.

Figure 18:
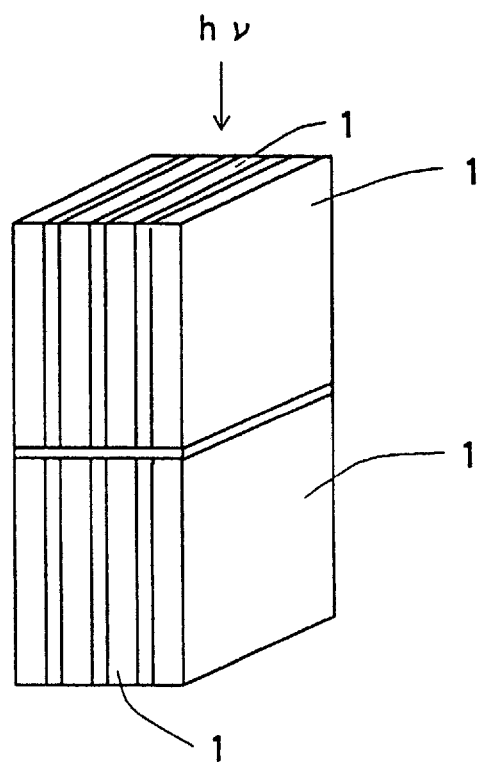
FIG. 18 is a perspective view illustrating a semiconductor device according to a seventeenth embodiment of the present invention.

FIG. 18 is a perspective view illustrating a semiconductor device according to a seventeenth embodiment of the present invention, wherein, basically, an increase in the detection efficiency of radiation in the high-energy region is achieved by making radiation incident in parallel with the surface having a $P^+$ type impurity region formed therein, i.e., in a direction perpendicular to the thicknesswise direction of the substrate as in the case of the fifteenth embodiment, and wherein a laminate wherein a large number of PIN diodes 1 each having basically the same structure as that of the PIN diode illustrated in FIG. 3 is laminated in two stages so that the surfaces of the substrates having the P⁻ type impurity region formed therein may become parallel with each other, whereby radiation is made to be incident in parallel with the bonded faces in the laminate.

In the seventeenth embodiment of the present invention, it is possible to realize the conversion of the semiconductor device to a one-dimensional version by taking out independently a signal from each PIN diode.

Also, by composing the PIN diodes into a single laminate, it is possible to overcome the problem that the strength would be low through mere pile-up of a single PIN diode.

Figure 19:
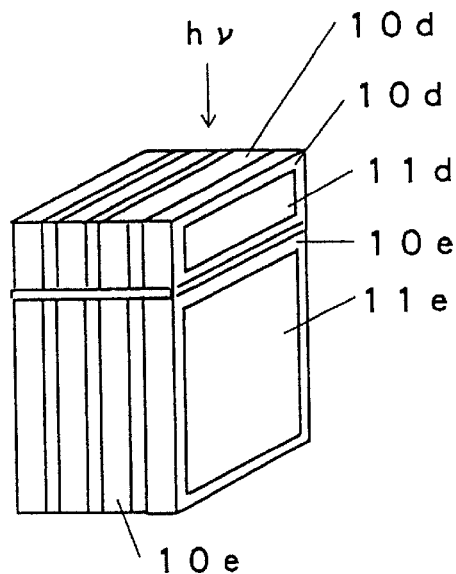
FIG. 19 is a perspective view illustrating a semiconductor device according to an eighteenth embodiment of the present invention.

FIG. 19 is a perspective view illustrating a semiconductor device according to an eighteenth embodiment of the present invention, which is a modified example of the seventeenth embodiment of the present invention as illustrated in FIG. 18, wherein the lengths of the P⁺ type impurity regions 11$d$ and 11$e$, formed in an N⁻ type semiconductor substrate 10$d$ and N⁻ type semiconductor substrate 10$e$ of each laminate, as viewed in the incidence direction of the radiation are varied and, as the layer becomes farther from the detection surface, the length thereof is made to be greater, whereby the detection efficiency of the high energy radiation in the lower layer is improved.

Figure 20:
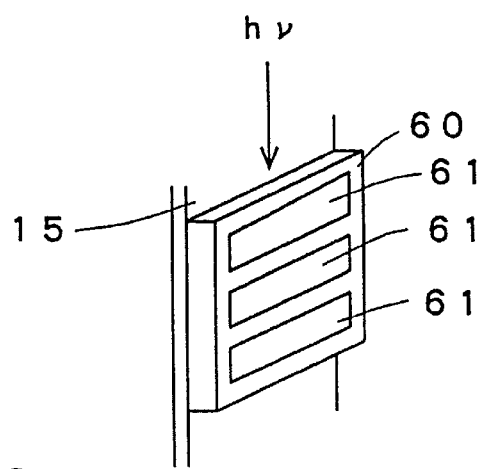
FIG. 20 is a perspective view illustrating a semiconductor device according to a nineteenth embodiment of the present invention.

FIG. 20 is a perspective view illustrating a semiconductor device according to a nineteenth embodiment of the present invention, wherein a P⁺ type impurity region 61 is formed in a single N⁻ type semiconductor substrate 60 on a mounting substrate 15 by being divided in a direction perpendicular to the incidence direction, whereby the same effect as is obtainable with the fifteenth embodiment illustrated in FIG. 15 is obtained.

Figure 21:
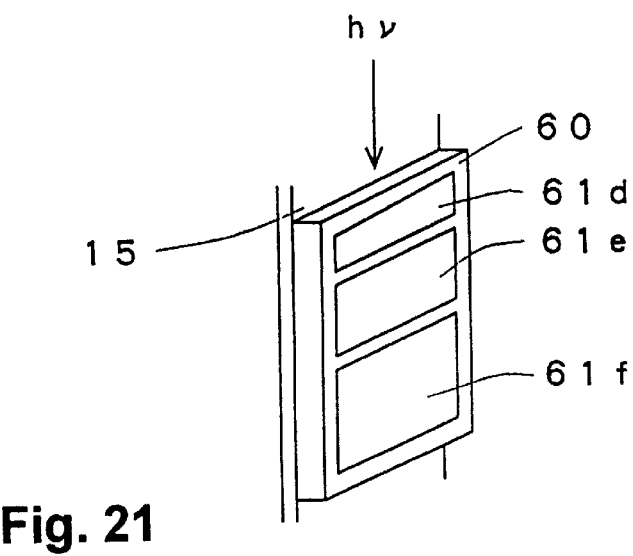
FIG. 21 is a perspective view illustrating a semiconductor device according to a twentieth embodiment of the present invention.

FIG. 21 is a perspective view illustrating a semiconductor device according to a twentieth embodiment of the present invention, wherein a P⁺ type impurity region is formed in a single N⁻ type semiconductor substrate 60 on a mounting substrate 15 by being divided in a direction perpendicular to the incidence direction and made to be such as the P⁺ type impurity regions 61$d$, 61$e$ and 61$f$ and the lengths thereof as viewed in the advancing direction of the radiation are made to be greater sequentially from the incidence side, whereby the same effect as is obtainable with the sixteenth embodiment illustrated in FIG. 17 is obtained. As a result of this, it is possible to increase the detection efficiency in the high-energy region which is obtained from the PIN diode on which radiation is incident later.

Figure 22:
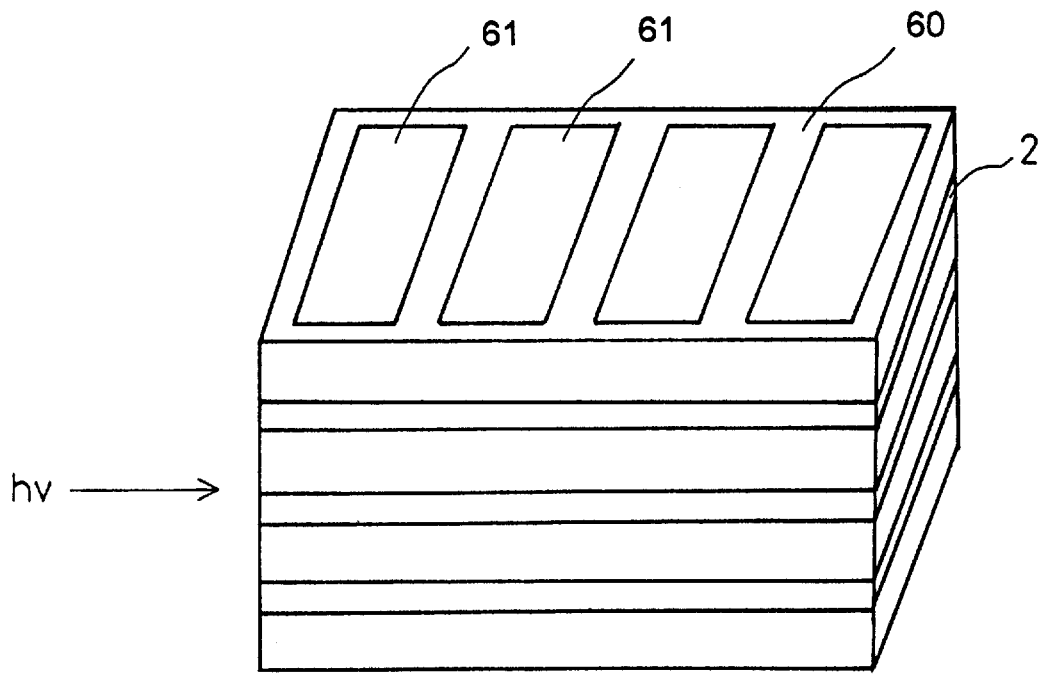
FIG. 22 is a perspective view illustrating a semiconductor device according to a twenty first embodiment of the present invention.

FIG. 22 is a perspective view illustrating a semiconductor device according to a twenty first embodiment of the present invention, wherein PIN diodes each having a large number of P⁺ type impurity regions 61, as divided in a direction perpendicular to the incidence direction, in the single N⁻ type semiconductor substrate 60 illustrated in FIG. 20, are laminated with a spacer 2 consisting of an insulative material being interposed between each adjacent two thereof, whereby a one-dimensional radiation-detecting function is realized by taking out independently a signal from each P⁺ type impurity region while, on the other hand, the intensity can be increased by synthesizing signals from the P⁺ type impurity regions of the respective laminates located in the same order from the incidence side.

Figure 23:
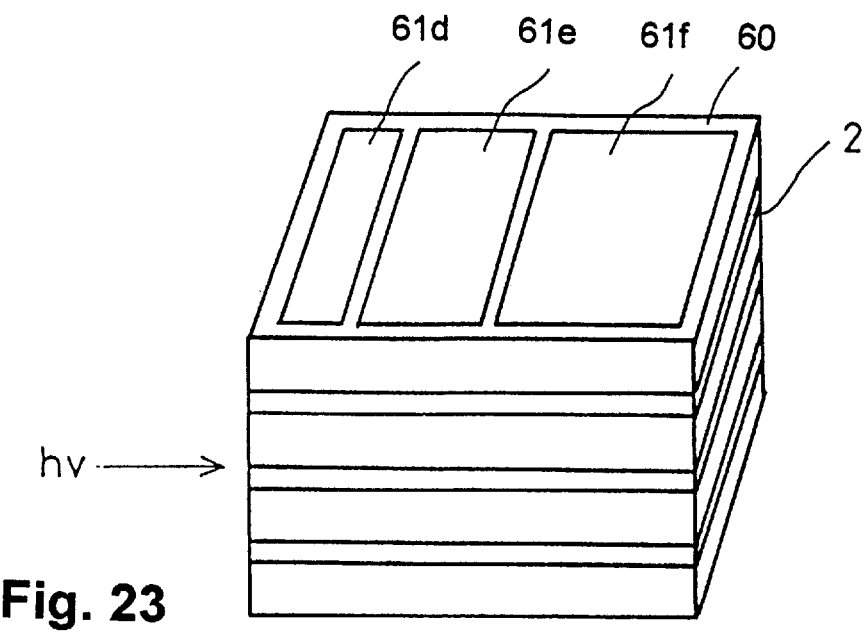
FIG. 23 is a perspective view illustrating a semiconductor device according to a twenty second embodiment of the present invention.

FIG. 23 is a perspective view illustrating a semiconductor device according to a twenty second embodiment of the present invention, which is a modified example of the semiconductor device according to the twenty first embodiment, wherein the lengths of P⁺ type impurity regions 61$d$, 61$e$ and 61$f$ of a single N⁻ type semiconductor substrate 60 as viewed in a direction parallel with the advancing direction of the radiation are made to be larger sequentially from the incidence side, whereby the resulting PIN diodes are laminated with a spacer 2 consisting of an insulative material being interposed between each adjacent two thereof. As a result of this, it is possible to increase the detection efficiency in the high-energy region which is obtained from the PIN diode on which radiation is incident later.

Figure 24:
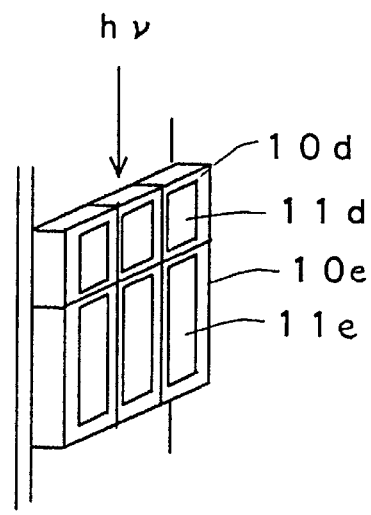
FIG. 24 is a perspective view illustrating a semiconductor device according to a twenty third embodiment of the present invention.

FIG. 24 is a perspective view illustrating a semiconductor device according to a twenty third embodiment of the present invention, wherein one-dimensional radiation detecting function for one dimensionally detecting radiation in a plurality of different detectable energy range is realized by arranging PIN diodes each having a single P⁺ type impurity region in a direction perpendicular to and in a direction parallel with the incidence direction of the radiation, and wherein N⁻ type semiconductor substrates 10$d$ and 10$e$ having the P⁺ type impurity regions 11$d$ and 11$e$ whose lengths as viewed in the parallel direction with the advancing direction of the radiation are different from each other are arranged so that as the layer becomes farther from the incidence side of the radiation, the length of the P⁺ type impurity region may become larger and this arrangement is spread in a direction intersecting the advancing direction of the radiation at a right angle with respect thereto.

Figure 25:
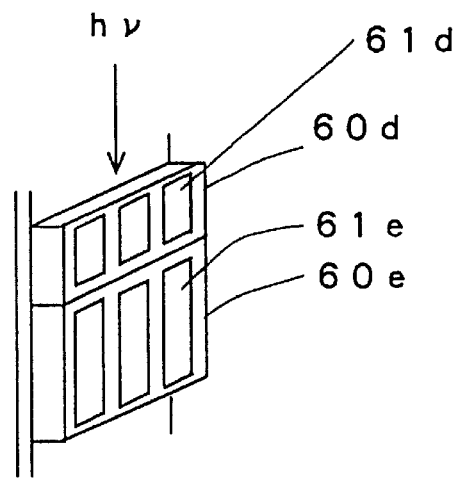
FIG. 25 is a perspective view illustrating a semiconductor device according to a twenty fourth embodiment of the present invention.

FIG. 25 is a perspective view illustrating a semiconductor device according to a twenty fourth embodiment of the present invention, which is a modified example of the twenty third embodiment, wherein one-dimensional radiation detection is realized by dividing the P⁺ type impurity region in a single substrate, N⁻ type semiconductor substrates 60$d$ and 60$e$ respectively having a large number of P⁺ type impurity regions 61$d$ and 61$e$ formed therein of which the length becomes larger as the region becomes farther from the incidence side of the radiation.

Figure 26:
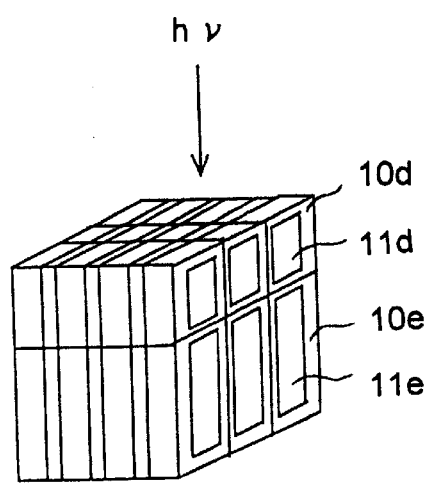
FIG. 26 is a perspective view illustrating a semiconductor device according to a twenty fifth embodiment of the present invention.

FIG. 26 is a perspective view illustrating a semiconductor device according to a twenty fifth embodiment of the present invention, which is another modified embodiment of the twenty third embodiment, wherein N⁻ type semiconductor substrates 10$d$ and 10$e$ having P⁺ type impurity regions 11$d$ and 11$e$ of which the lengths as viewed in the parallel direction with the advancing direction of the radiation are different from each other are arranged so that as the layer becomes farther from the incidence side of the radiation, the length of the P⁺ type impurity region may become larger and this arrangement is spread in directions intersecting the advancing direction of the radiation at a right angle with respect thereto. This structure is that wherein the semiconductor device according to the twenty third embodiment has been piled up and wherein two-dimensional radiation detection is realized by taking out independently a signal from each PIN diode or the intensity can be increased by synthesizing signals from prescribed PIN diodes.

Figure 27:
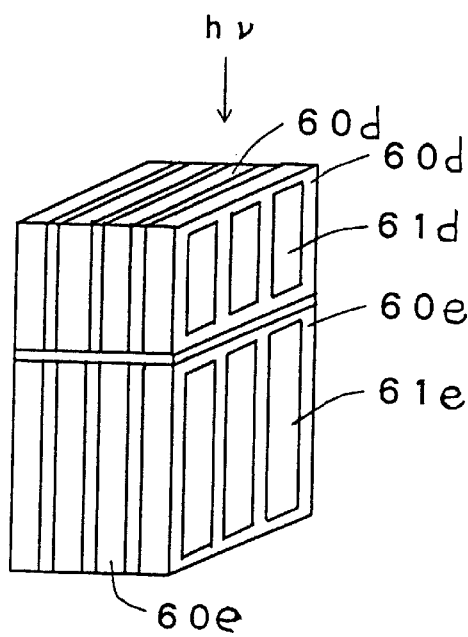
FIG. 27 is a perspective view illustrating a semiconductor device according to a twenty sixth embodiment of the present invention.

FIG. 27 is a perspective view illustrating a semiconductor device according to a twenty sixth embodiment of the present invention, which is a modified example of the twenty fourth embodiment, wherein N⁻ type semiconductor substrates 60$d$ and 60$e$ having a large number of P⁺ type impurity regions 61$d$ and 61$e$ formed therein are arranged so that as the layer becomes farther from the incidence side of the radiation, the length of the P⁺ type impurity region may become larger and this structure is spread in a direction intersecting the advancing direction of the radiation at a right angle with respect thereto. This structure is that wherein the semiconductor device according to the twenty fourth embodiment has been piled up and wherein two-dimensional radiation detection is realized by taking out independently a signal from each PIN diode or the intensity can be increased by synthesizing signals from prescribed PIN diodes.

Figure 28:
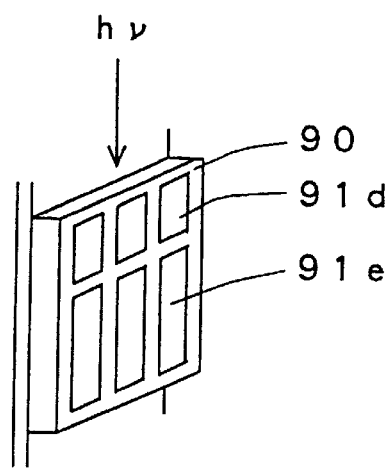
FIG. 28 is a perspective view illustrating a semiconductor device according to a twenty seventh embodiment of the present invention.

FIG. 28 is a perspective view illustrating a semiconductor device according to a twenty seventh embodiment of the present invention, which is a modified example of the twenty third embodiment, wherein the length of a $P^+$ type impurity region of a single $N^-$ type semiconductor substrate 90 as viewed in the advancing direction of the radiation is made to be the same in a direction perpendicular to this advancing direction and is divided, in the advancing direction, such as $P^+$ type impurity regions 91d and 91e, so that as the region becomes farther from the incidence side, the length thereof becomes larger, whereby one-dimensional radiation detecting function for one-dimensionally detecting radiation in a plurality of different detectable energy range, which is equivalent to that realized in the twenty third embodiment is realized.

Figure 29:
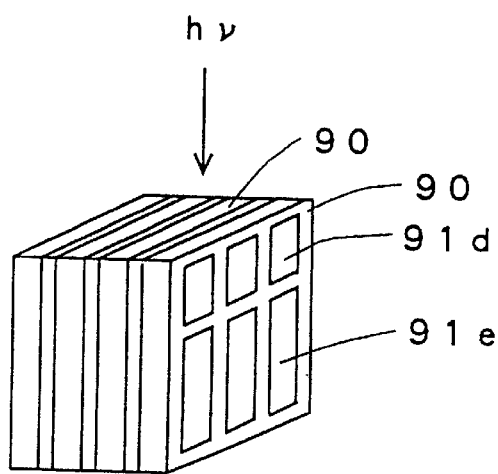
FIG. 29 is a perspective view illustrating a semiconductor device according to a twenty eighth embodiment of the present invention.

FIG. 29 is a perspective view illustrating a semiconductor device according to a twenty eighth embodiment of the present invention, which is a modified example of the twenty seventh embodiment, wherein by three-dimensionally piling up the semiconductor device according to the twenty seventh embodiment, two-dimensional radiation detection is realized by taking out independently a signal from each PIN diode or the intensity can be made to be increased by synthesizing signals from prescribed PIN diodes.

Figure 30:
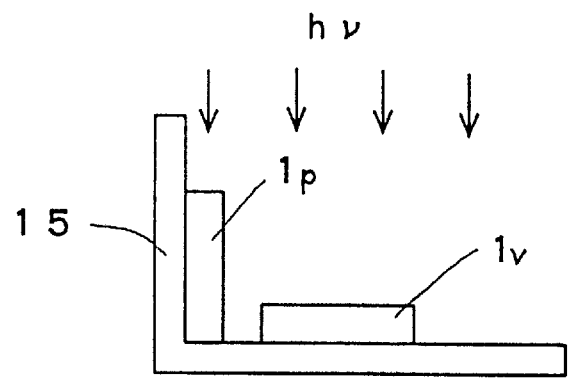
FIG. 30 is a perspective view illustrating a semiconductor device according to a twenty ninth embodiment of the present invention.

FIG. 30 is a side view illustrating a semiconductor device according to a twenty ninth embodiment of the present invention, wherein on a mounting substrate 15 there are installed PIN diodes 1p and 1v so that, in one PIN diode 1p, radiation is made to be incident thereon in a direction parallel with the surface having a $P^+$ type impurity region formed therein, namely, with a usual end surface of the semiconductor substrate of the PIN diode being used as the incidence surface and, in the other PIN diode 1v, radiation is made to be incident thereon in a direction perpendicular to the surface having the $P^+$ type impurity region formed therein, namely, incident on a usual light receiving surface of the PIN diode.

Figure 37:
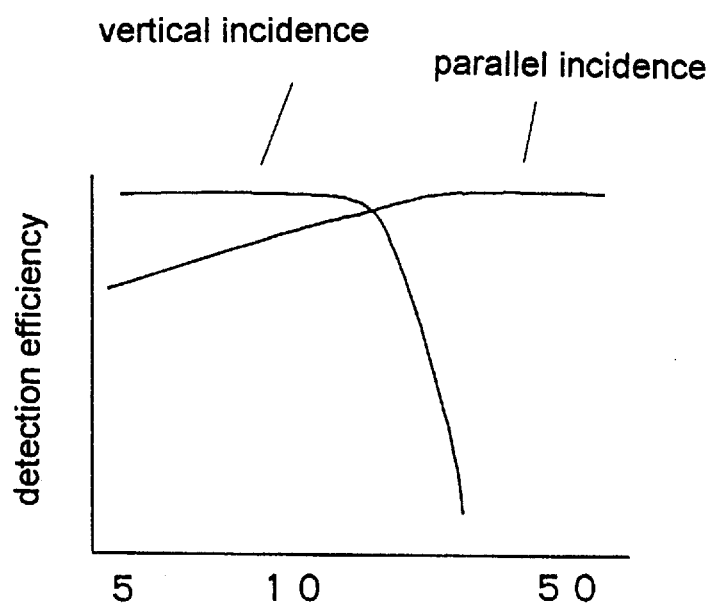
FIG. 37 is a characteristic curve diagram illustrating the detection efficiency of radiation energy in the case of the twenty ninth embodiment of the present invention.

FIG. 37 is a characteristic curve diagram illustrating the detection efficiency of the radiation energy in the twenty ninth embodiment of the present invention, which is obtained in the case of using a silicon PIN diode having a thickness of 500 µm, whose depletion layer is extended up to a depth of 300 µm.

It is seen that in a region of energy wherein the detection efficiency decreases by vertical incidence, the detection efficiency by parallel incidence rather increases.

Figure 31:
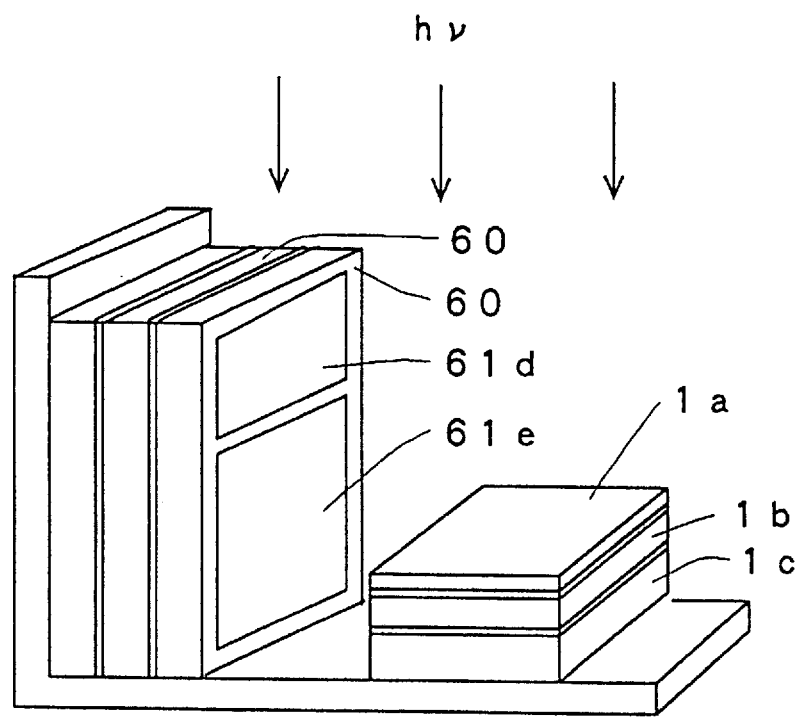
FIG. 31 is a perspective view illustrating a semiconductor device according to a thirtieth embodiment of the present invention.

FIG. 31 is a perspective view illustrating a semiconductor device according to a thirtieth embodiment of the present invention, wherein the semiconductor device of the third embodiment and that of the twenty second embodiment are used, whereby independent detection of radiation in each different detectable energy band becomes possible.

That is to say, PIN diodes 1a, ib and 1c whose substrates are different in thickness from each other are laminated in such a manner that the thickness of the substrate becomes thicker from the top toward the bottom while, on the other hand, a laminate wherein there are laminated a large number of $N^-$ type semiconductor substrates 60 each having formed therein $P^+$ type impurity regions 61d and 61e different in width from each other is installed so that as the region becomes farther from the incidence side, the width of the $P^+$ type impurity region may become larger, whereby radiation is made to be incident thereon in a direction parallel with the wider surface of the substrate, i.e., the surface having the $P^+$ type impurity region formed therein.

Meanwhile, when considering the incidence of radiation in parallel with the surface having the $P^+$ type impurity region formed therein, i.e., the wider surface of the substrate, a semiconductor device according to a thirty first embodiment of the present invention is obtained based on the semiconductor device wherein the PIN diodes illustrated in FIG. 1 are laminated.

That is, at least one surface of the semiconductor device is used for fixation thereof and take-out of signals to the outside thereof and the remaining five surfaces thereof is used as the detection surfaces.

In the semiconductor device according to the thirty first embodiment of the present invention, which has a structure as illustrated in FIG. 5 of which the five surfaces are used as the detection surfaces, it is possible to detect data on different energy range in the relatively low energy radiation region by vertical incidence with respect to the substrate and it is possible to obtain one-dimensional data on the high energy radiation by parallel incidence with respect to the substrate. In addition, by varying the thickness of the substrate of FIG. 1 as viewed in the x and y directions, it is possible to detect energy band data differing according to the detection surface.

Figure 32:
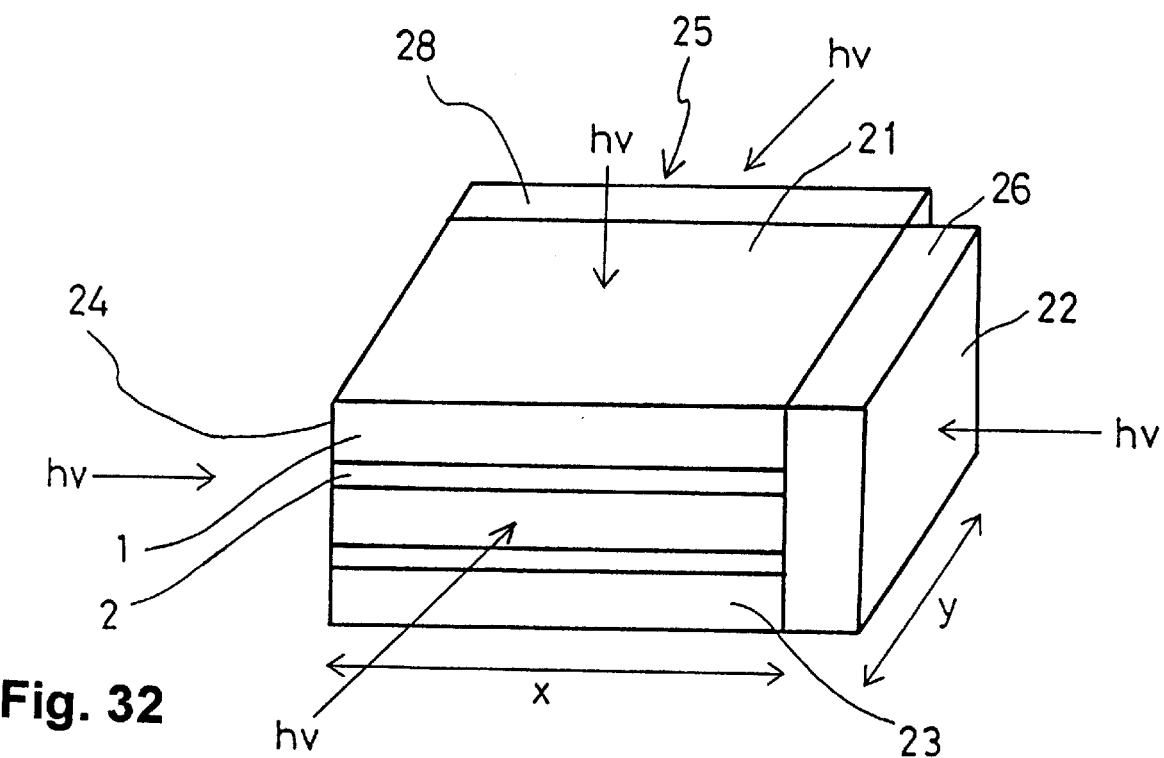
FIG. 32 is a perspective view illustrating a semiconductor device according to a thirty second embodiment of the present invention.

FIG. 32 is a perspective view illustrating a semiconductor device according to a thirty second embodiment of the present invention, wherein absorption layers for absorbing a low energy of radiation are provided on several surfaces of five detection surfaces 21, 22, 23, 24 and 25 of the semiconductor device wherein the PIN diodes 1 of a structure illustrated in FIG. 3 are laminated with a spacer 2 being interposed between each adjacent two thereof, for example, absorption layers 26 and 28 are provided on two surfaces thereof in this case. In addition, by varying the lengths as viewed in the x and y directions, it becomes possible to detect various energy band data from each detection surface.

Figure 33:
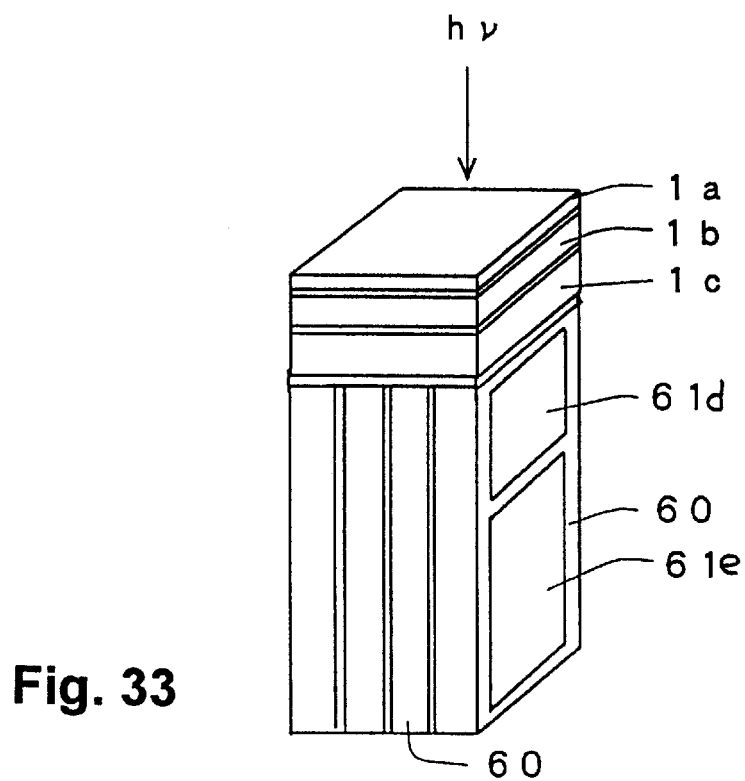
FIG. 33 is a perspective view illustrating a semiconductor device according to a thirty third embodiment of the present invention.

FIG. 33 is a conceptual perspective view illustrating a semiconductor device according to a thirty third embodiment of the present invention, wherein the semiconductor device according to the third embodiment of the present invention is piled up on the semiconductor device according to the twenty second embodiment of the present invention. While the thirtieth or thirty second embodiment has the drawback that measurement in same place and at same time is impossible by vertical and parallel incidence with respect to the substrate, this embodiment can overcome this drawback.

That is, on a laminate wherein PIN diodes 1a, 1b and 1c whose substrates have different thicknesses are laminated so that the thickness of the substrate may become thicker from the top toward the bottom, radiation is made to be incident in a direction perpendicular to the wider surface of the substrate and under this laminate there is stacked a laminate wherein there are laminated a large number of $N^-$ type semiconductor substrates having formed therein $P^+$ type impurity regions 61d and 61e differing in width from each other, so that as the region becomes farther from the incidence side, the width of the $P^+$ type impurity region as viewed in the incidence direction may become larger and so that radiation may be incident in parallel with the wider surface of the substrate, namely the surface having the $P^+$ type impurity region formed therein.

Figure 34:
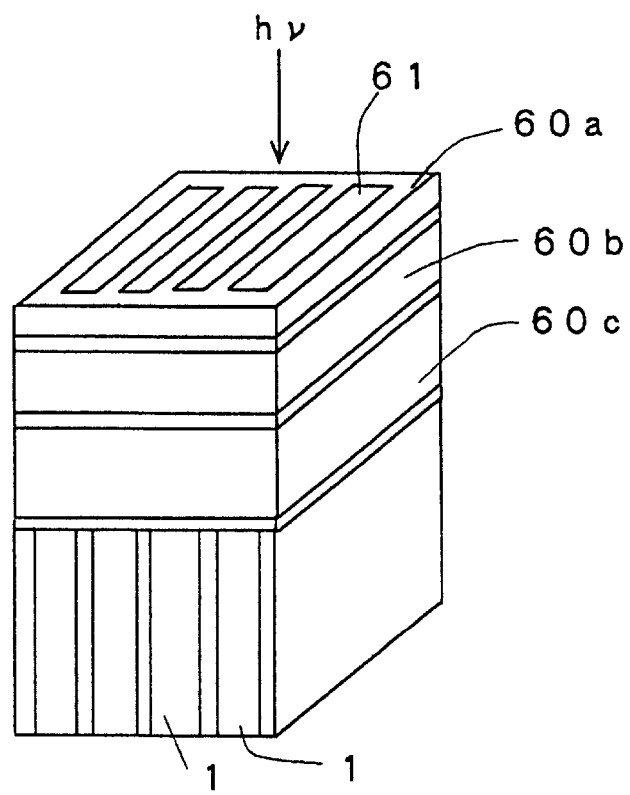
FIG. 34 is a perspective view illustrating a semiconductor device according to a thirty fourth embodiment of the present invention.

FIG. 34 is a conceptual perspective view illustrating a semiconductor device according to a thirty fourth embodiment of the present invention, wherein the semiconductor device according to the fifth embodiment of the present invention is piled up on the semiconductor device according to the eighteenth embodiment of the present invention. Measurement in same place and at same time can be made by vertical and parallel incidence with respect to the substrate and one-dimensional measurement is also possible. That is, on a laminate wherein N⁻ type semiconductor substrates 60a, 60b and 60c whose P⁺ type impurity region 61 is divided into strips and the thicknesses of which are different from each other are laminated so that the thickness of the substrate may become larger from the top toward the bottom, radiation is incident in a direction perpendicular to the wider surface of the substrate, i.e., the surface having the P⁺ type impurity region formed therein, and, under this laminate, there is stacked a laminate wherein a large number of PIN diodes 1 are laminated, so that radiation may be incident in parallel with the wider surface of the substrate. In this case, the pitch of the P⁺ type impurity regions 61 of the N⁻ type semiconductor substrates 60a, 60b and 60c is made to be the same as the pitch of the laminations of the PIN diodes 1.

Figure 35:
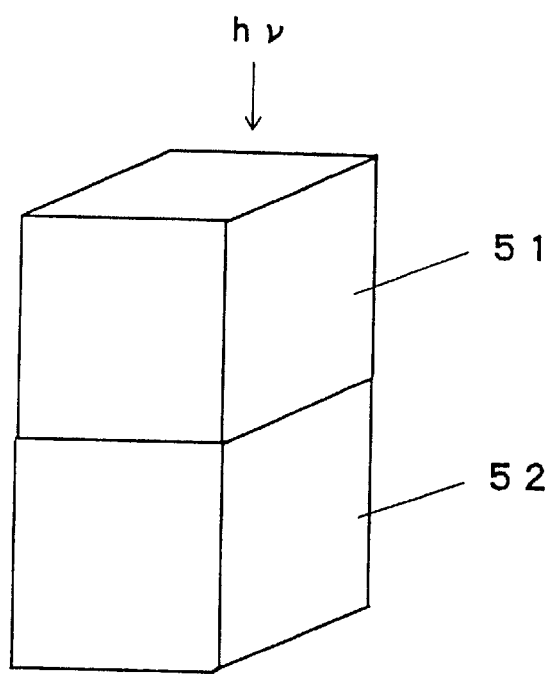
FIG. 35 is a perspective view illustrating a principle in the case where vertical and parallel incidences of radiation upon the substrate of the present invention are simultaneously done.

FIG. 35 is a perspective view illustrating a general principle in cases such as the thirty third and thirty fourth embodiments where measurement in same place and at same time is possible by vertical and parallel incidence with respect to the substrate of the present invention. A semiconductor radiation-detecting device 51 wherein incident rays are detected initially includes the semiconductor radiation-detecting devices according to the first, second, third, fourth, fifth, sixth, seventh, eighth, ninth, tenth, eleventh and twelfth embodiments while, on the other hand, a lower semiconductor radiation-detecting device 52 includes the semiconductor radiation-detecting devices according to the seventeenth, eighteenth, twenty first, twenty second, twenty fifth, twenty sixth and twenty eighth embodiments.

By applying the silicon semiconductor radiation-detecting device of the present invention to an X-ray CT apparatus, excellent results are obtained.

Figure 38:
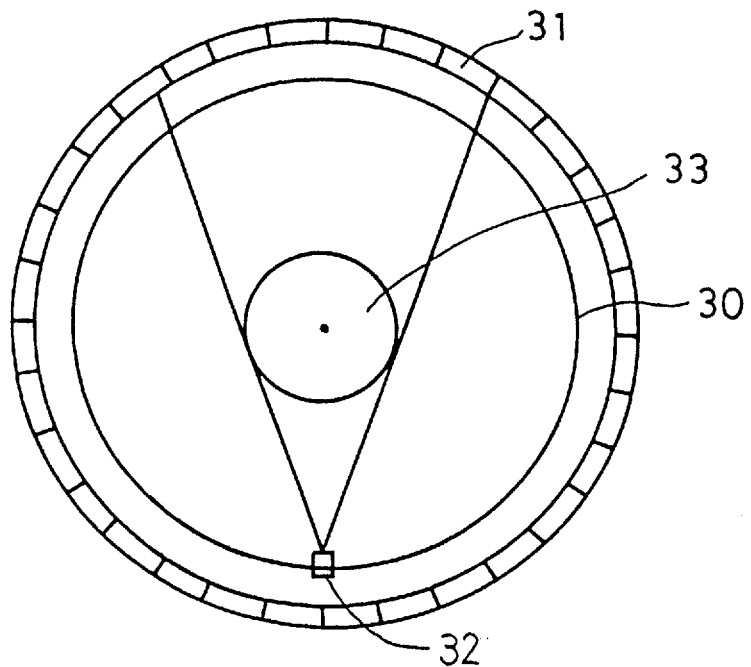
FIG. 38 is a conceptual view illustrating an X-ray CT apparatus having applied thereto the semiconductor device of the present invention.
Figure 39:
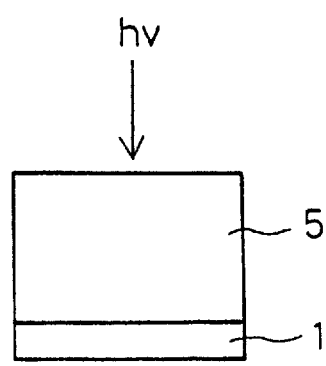
FIG. 39 is a conceptual view illustrating a conventional method for detecting radiation.

As in FIG. 38 which illustrates an embodiment as a conceptual view, a semiconductor radiation-detecting device 31 such as that according to the seventeenth, eighteenth, twenty first, twenty second or thirty fourth embodiment of the present invention is used as a detector applicable to an X-ray CT apparatus for use in medical treatments.

In this case, an X-ray source 32 is rotated by an angle of 360 degrees along a rotation circle 30 and, correspondingly to this rotation, a large number of detectors 31 of the present invention are disposed circularly, whereby X rays having transmitted through a living body 33 as an examination object are detected by the detectors 31 of the present invention.

When using the semiconductor radiation-detecting devices as the detectors for use in an X-ray CT apparatus, data on X rays in different energy range are obtained with the result that a higher level of data concerning the differences between the tissues such as the muscular tissue, bone tissue and the like can be obtained.

The semiconductor radiation-detecting devices according to the embodiments of the present invention such as the seventeenth, eighteenth, twenty first, twenty second, twenty fifth, twenty sixth, twenty eighth, thirtieth, thirty third, thirty second or thirty fourth embodiment enable direct detection of radiation in an energy range of from X rays having several tens to several hundreds of keV to γ rays and can therefore be applied to an X-ray CT apparatus, a positron CT apparatus or the like for industrial use.

Meanwhile, in the present invention, the energy band sensed by each detection region (each substrate or P⁺ type impurity region) is different as stated in connection with, for example, FIG. 36 or FIG. 37. Therefore, even when no pulse height analysis is performed as not in the prior art, data on energy are obtained. Therefore, measurement of energy in the current mode is possible and in addition even when a reverse voltage applied to the PN junction is made bias-free, measurement of the energy is still possible.

Accordingly, in the case of measurement of plasma X rays or the like where there are a very large number of photons, this measurement in the current mode is effective and in addition is still possible even in a bias-less condition.

In the case of such measurement where photons are large in number, performance of the pulse height analysis causes occurrence of pile-up phenomena, with the result that excellent measurement is impossible.

As explained above, according to the present invention, by adopting a structure wherein PIN diodes are laminated as a novel radiation detecting element, it is possible to provide an excellent radiation detector enabling detection of radiation having different energy range.

What is claimed is:

1. A semiconductor radiation-detecting device for detecting radiation in different energy ranges, wherein first and second silicon semiconductor substrates each having a second conductivity type impurity region in a first conductivity type silicon semiconductor substrate thereof are arranged, whereby with a direction parallel with a surface of semiconductor substrate having the second conductivity type impurity region being made to be an incidence direction, said substrates are positioned relative to one another so that radiation which is incident on the second conductivity type impurity region of the second semiconductor substrate first passes through the second conductivity type impurity region of the first semiconductor substrate to thereby detect radiation in different energy ranges.

2. A semiconductor radiation-detecting device wherein laminates composed of semiconductor substrates each having a second conductivity type impurity region in a first conductivity type silicon semiconductor substrate thereof are piled up one over the other in such a manner that in a first one of the laminates a surface of the semiconductor substrate having the second conductivity type impurity region is parallel with a surface of bond between the laminates and in a second one of the laminates a surface of the semiconductor substrate having the second conductivity type impurity region is perpendicular to the surface of bond between the laminates and that the first one of the laminates wherein the surface of the semiconductor substrate having the second conductivity type impurity region is parallel with a surface of bond between the laminates is located at the uppermost position of the piled-up structure, whereby radiation is incident in a direction perpendicular to the surface of bond between the laminates from a side of the first one of the laminates wherein the surface of the semiconductor substrate having the second conductivity type impurity region is parallel with the surface of bond and radiation which is incident on the second conductivity type impurity region in the substrate of the second one of the laminates first passes through the second conductivity type region of substrate of the first one of the laminates to thereby detect radiation in different energy ranges.

3. A semiconductor radiation-detecting device wherein there are provided two or more semiconductor radiation-detecting device each having a second conductivity type impurity region in a first conductivity type silicon semiconductor substrate thereof and, in one group of the semiconductor radiation-detecting devices, there are first and second radiation-detecting devices and radiation is incident thereon with a direction perpendicular to a surface of each substrate having the second conductivity type impurity region being an incidence direction while, on the other hand, in another group of the semiconductor radiation-detecting devices, radiation is incident thereon with a direction parallel to each substrate having the second conductivity type impurity region being an incidence direction, and said first and second radiation-detecting devices are positioned relative to one another so that radiation which is incident on the second conductivity type impurity region of said second radiation-detecting device first passes through the second conductivity type region of said first radiation-detecting device to thereby detect radiation in different energy ranges.

4. A semiconductor radiation-detecting device for radiation as set forth in claim 3, wherein radiation is measured in a current mode.

5. A semiconductor radiation-detecting device wherein first and second silicon semiconductors each having a second conductivity type impurity region in a first conductivity type silicon semiconductor substrate thereof are laminated so that said first semiconductor is over said second semiconductor, whereby radiation is incident thereon from a direction perpendicular to a surface of each substrate having the second conductivity type impurity region and a direction parallel with a surface of each substrate having the second conductivity type impurity region and at least some of the radiation which is incident on the second conductivity type impurity region of said second semiconductor first passes through the second conductivity type region of said first semiconductor, to thereby change the number of detection surfaces from two surfaces to five surfaces.

6. A semiconductor radiation-detecting device for radiation wherein semiconductor substrates each having a second conductivity type impurity region in a first conductivity type silicon semiconductor substrate are laminated one over another, whereby radiation is incident, in a direction perpendicular to a surface of the semiconductor substrate having the second conductivity type impurity region and signals obtained are detected independently in units of the semiconductor substrate to thereby detect radiation in different energy ranges and radiation is measured in a current mode.

7. A semiconductor radiation-detecting device for radiation as set forth in claim 6, wherein in the semiconductor substrate a reverse bias voltage applied to a PN junction formed by the first conductivity type substrate and the second conductivity type impurity region is made bias-free.

* * * * *